United States Patent
Asanuma et al.

(10) Patent No.: US 9,348,023 B2
(45) Date of Patent: May 24, 2016

(54) RADAR APPARATUS AND SIGNAL PROCESSING METHOD

(71) Applicant: FUJITSU TEN LIMITED, Kobe-shi, Hyogo (JP)

(72) Inventors: Hisateru Asanuma, Kobe (JP); Hiroyuki Ishimori, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 231 days.

(21) Appl. No.: 14/071,906

(22) Filed: Nov. 5, 2013

(65) Prior Publication Data

US 2014/0159946 A1    Jun. 12, 2014

(30) Foreign Application Priority Data

Dec. 7, 2012   (JP) ................................. 2012-268064

(51) Int. Cl.
*G01S 7/35* (2006.01)
*G01S 13/34* (2006.01)
(Continued)

(52) U.S. Cl.
CPC .............. *G01S 13/931* (2013.01); *G01S 13/34* (2013.01); *G01S 13/345* (2013.01); *G01S 13/93* (2013.01)

(58) Field of Classification Search
CPC ......... G01S 13/02; G01S 13/06; G01S 13/08; G01S 13/32; G01S 13/34; G01S 13/345; G01S 13/88; G01S 13/93; G01S 13/931; G01S 13/003; G01S 13/343; G01S 13/50; G01S 13/52; G01S 13/522; G01S 13/524; G01S 13/5242; G01S 13/74; G01S 13/82; G01S 13/84; G01S 13/10; G01S 13/26; G01S 13/28; G01S 13/284; G01S 15/02; G01S 15/50; G01S 15/58; G01S 15/60

USPC ................... 342/89–103, 118, 128–133, 175, 342/192–197, 70, 146, 147, 159–163, 200; 367/87, 99, 100
See application file for complete search history.

(56) References Cited

U.S. PATENT DOCUMENTS 3,886,487 A * 5/1975 Walsh ..................... G01S 15/60
                                                         367/100
3,903,525 A * 9/1975 Mullins ............... G01S 13/5242
                                                         342/161

(Continued)

FOREIGN PATENT DOCUMENTS

| CN | 1459029 A | 11/2003 |
| CN | 1898579 A | 1/2007 |
| JP | A-2009-92429 | 4/2009 |

OTHER PUBLICATIONS

Nov. 27, 2015 Office Action issued in Chinese Application No. 201310540848.9.

*Primary Examiner* — Bernarr Gregory
(74) *Attorney, Agent, or Firm* — Oliff PLC

(57) ABSTRACT

There is provided a radar apparatus configured to extract peak signals which are obtained from a difference frequency between a transmission signal and a reception signal, and to derive information of the target on the basis of the extracted peak signals. A prediction unit predicts this time peak signal based on a peak signal obtained in previous time. An extraction unit extracts this time peak signal corresponding to the predicted peak signal from peak signals existing within a predetermined frequency range. The extraction unit extends the frequency range when this time peak signal corresponding to the predicted peak signal does not exist within the predetermined frequency range.

9 Claims, 15 Drawing Sheets

(51) Int. Cl.
G01S 13/93 (2006.01)
G01S 13/00 (2006.01)

(56) References Cited

U.S. PATENT DOCUMENTS

| | | | | |
|---|---|---|---|---|
| 3,952,302 A * | 4/1976 | Mullins | ............... | G01S 13/5242 342/161 |
| 4,057,801 A * | 11/1977 | Holladay, Jr. | ........... | G01S 13/84 342/129 |
| 4,947,354 A * | 8/1990 | Hethuin | ................ | G01S 13/343 342/128 |
| 5,619,208 A * | 4/1997 | Tamatsu | ................ | G01S 13/345 342/128 |
| 5,818,371 A * | 10/1998 | Lu | ......................... | G01S 13/003 342/192 |
| 5,963,162 A * | 10/1999 | Mochizuki | ........... | G01S 13/345 342/70 |
| 6,940,450 B2 * | 9/2005 | Blunt | .................... | G01S 13/284 342/118 |
| 7,106,250 B2 * | 9/2006 | Blunt | .................... | G01S 13/284 342/118 |
| 7,336,218 B2 * | 2/2008 | Nishimura | ............ | G01S 13/345 342/128 |
| 7,391,361 B2 * | 6/2008 | Kishida | ................. | G01S 13/345 342/192 |
| 7,432,849 B2 * | 10/2008 | Noda | ..................... | G01S 13/34 342/128 |
| 8,427,361 B2 * | 4/2013 | Sato | ...................... | G01S 13/345 342/128 |
| 8,441,395 B2 * | 5/2013 | Kanamoto | ........... | G01S 13/345 342/147 |
| 8,648,745 B2 * | 2/2014 | Kanamoto | ........... | G01S 13/931 342/194 |
| 8,760,341 B2 * | 6/2014 | Nakagawa | ........... | G01S 13/345 342/128 |
| 8,847,815 B2 * | 9/2014 | Kanamoto | ........... | G01S 13/345 342/128 |
| 8,907,840 B2 * | 12/2014 | Kanamoto | ........... | G01S 13/345 342/146 |
| 2003/0142007 A1 | 7/2003 | Ono et al. | | |
| 2007/0153255 A1 | 7/2007 | Ishii et al. | | |
| 2008/0079629 A1 * | 4/2008 | Oka | ...................... | G01S 13/345 342/128 |
| 2011/0084872 A1 * | 4/2011 | Kishida | ................. | G01S 13/345 342/146 |

* cited by examiner

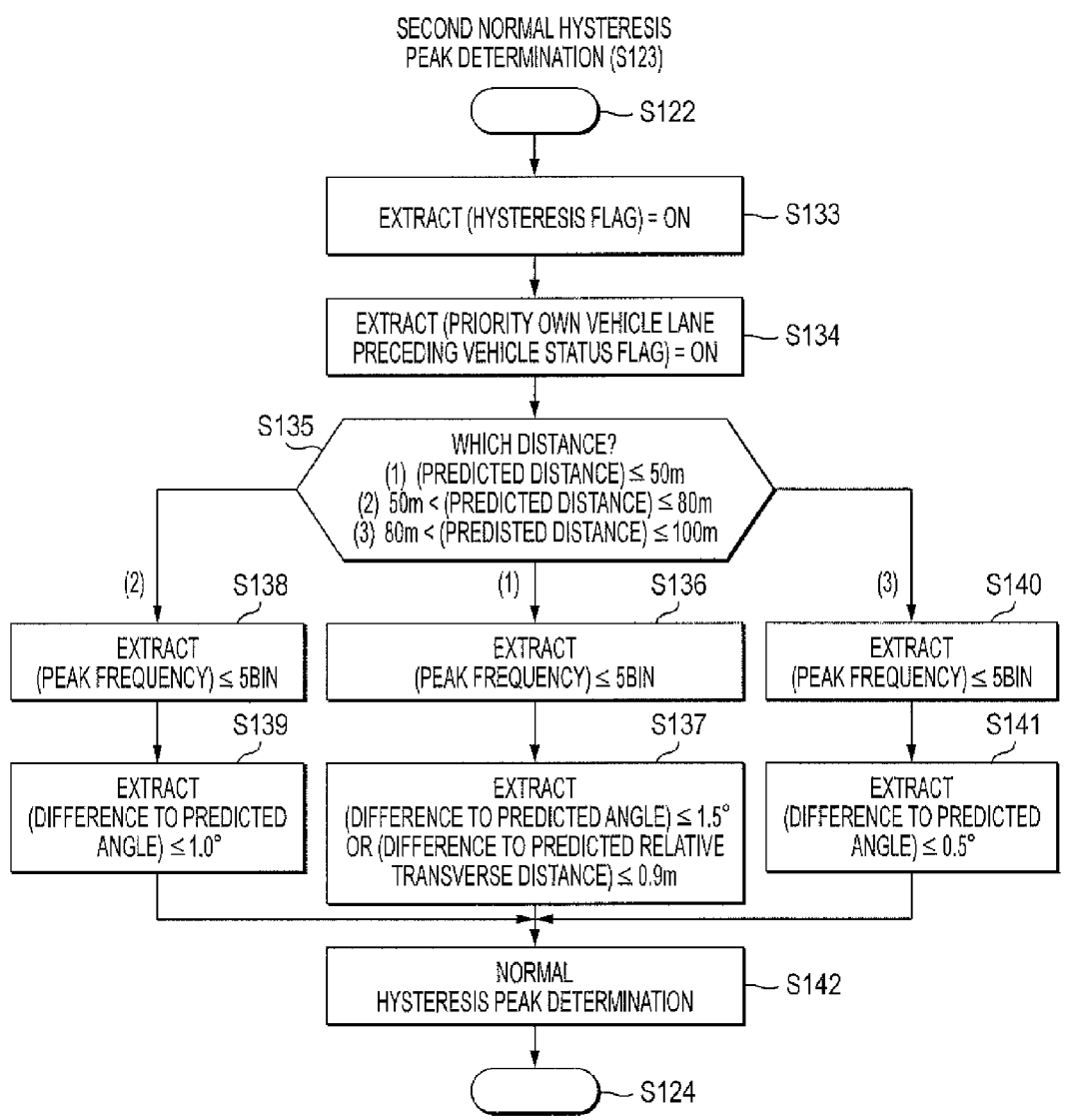

RADAR APPARATUS AND SIGNAL PROCESSING METHOD

CROSS-REFERENCE TO RELATED APPLICATIONS

This application is based on and claims priority from Japanese Patent Application No. 2012-268064 filed on Dec. 7, 2012.

TECHNICAL FIELD

The invention relates to signal processing for derivation of a target.

BACKGROUND

In the past, a radar apparatus mounted on a vehicle emits a transmission wave from a transmission antenna and receives a reflected wave from a target, which reflects the emitted transmission wave, at a reception antenna to thus derive a target position and the like with respect to the vehicle (radar vehicle). The detailed processing thereof is as follows. A signal processing unit of the radar apparatus generates a beat signal by mixing a transmission signal corresponding to the transmission wave of which a frequency is changed with a predetermined period and a reception signal corresponding to the reflected wave. That is, the signal processing unit generates the beat signal based on a difference frequency (beat frequency) between the transmission signal and the reception signal in each of an UP section in which the frequency ascends with a predetermined period and a DOWN section in which the frequency descends.

Then, the signal processing unit generates a signal (hereinafter, referred to as a 'converted signal') with respect to each frequency by performing FFT (Fast Fourier Transform) for the beat signal. From the converted signals, the signal processing unit extracts a signal exceeding a threshold value of a predetermined signal level as a peak signal. Then, the signal processing unit derives paired data by pairing the peak signal of the UP section and the peak signal of the DOWN section based on a predetermined condition.

For example, the signal processing unit predicts this time paired data (hereinafter, referred to as 'predicted paired data') on the basis of the paired data derived in the past, derives a peak signal (hereinafter, referred to as a 'hysteresis peak signal') predicting this time peak signal from the predicted paired data and extracts this time peak signal corresponding to the hysteresis peak signal in each of the UP and DOWN sections. Then, the signal processing unit derives paired data from the frequency and angle information of the extracted hysteresis peak signal by pairing the corresponding hysteresis peak signals of the respective sections.

Then, the signal processing unit derives a distance (hereinafter, referred to a longitudinal distance) from the vehicle to the target or a distance (hereinafter, referred to as a transverse distance) of the target with respect to the vehicle in a direction substantially orthogonal to a traveling direction of the vehicle, based on the paired data. Also, the signal processing unit derives a relative speed and angle of the target with respect to the vehicle. Then, the radar apparatus outputs the information on the position, the relative speed and the like of the decided target to a vehicle control device. The vehicle control device performs required vehicle control in accordance with the information of the target. In the meantime, for example, Patent Document 1 discloses a technology relating to the invention.

Patent Document 1: Japanese Patent Application Publication No. 2009-092429A

However, when a plurality of targets exists at the periphery of the vehicle and the reception antenna receives the reflected waves from the plurality of targets at the same time, a plurality of peak signals appears on a frequency axis in the UP and DOWN sections after the FFT processing. Also, not only the peak signals corresponding to the targets but signals due to noises individually appear as the peak signals.

In particular, the peaks signals corresponding to the plurality of targets existing at the same distance from the vehicle appear at the same frequency. Therefore, upon deriving the angle information so as to separate the peak signals, when a reception signal level of a reflected wave from a road side object such as a soundproof wall is higher than a reception signal level of a reflected wave from a preceding vehicle, an angle spectrum of the preceding vehicle is concealed in an angle spectrum of the road side object, so that it may not be extracted. In this case, since the preceding vehicle is not detected, the preceding vehicle that originally exists is regarded as been non-existent, so that the vehicle control device may perform false vehicle control.

SUMMARY

It is therefore an object of the invention to provide a technology for avoiding performing false vehicle control when it is not possible to correctly extract this time angle peak corresponding to a hysteresis peak.

(1) According to an aspect of the embodiments of the present invention, there is provided a radar apparatus configured to extract peak signals which are obtained from a difference frequency between a transmission signal of which a frequency changes with a predetermined cycle and a reception signal obtained by receiving a reflected wave coming from a target at which a transmission wave corresponding to the transmission signal is reflected, in a first period in which the frequency of the transmission signal ascends and in a second period in which the frequency descends, and to derive information of the target on the basis of the extracted peak signals, the radar apparatus comprising: a prediction unit configured to predict this time peak signal based on a peak signal obtained in previous time; and an extraction unit configured to extract this time peak signal corresponding to the predicted peak signal from peak signals existing within a predetermined frequency range, wherein the extraction unit extends the frequency range when this time peak signal corresponding to the predicted peak signal does not exist within the predetermined frequency range.

(2) The radar apparatus according to (1), further comprising a derivation unit configured to derive an angle with respect to the target on the basis of the peak signals, wherein the extraction unit extends the frequency range when there is no peak signal having an angle corresponding to an angle derived from the predicted peak signal.

(3) The radar apparatus according to (2), wherein the extraction unit extends the frequency range when there is no peak signal having an angle of which a difference to an angle derived from the predicted peak signal is a predetermined value or smaller.

(4) The radar apparatus according to (2) or (3), wherein the prediction unit predicts this time peak signal for the respective peak signals of the first and second periods, and wherein when there is no peak signal having an angle of which a difference to an angle derived from the predicted peak signal for at least one of the respective peak signals of the fusty and second periods is a predetermined value or smaller, the extraction unit extends the frequency range of the period in which the peak signal does not exist.

(5) The radar apparatus according to (3) or (4), wherein when the extraction unit extends the frequency range, the extraction unit decreases the predetermined value.

(6) The radar apparatus according to any one of (1) to (5), wherein the predetermined frequency range is a range in which a frequency of the predicted peak signal is a center thereof.

(7) The radar apparatus according to any one of (1) to (6), further comprising a derivation unit configured to derive the information of the target on the basis of the extracted peak signals, wherein when only an angle derived from the peak signal extracted in one of the first and second periods is an angle corresponding to an angle derived from the predicted peak signal, the derivation unit derives the information of the target on the basis of frequencies of the respective peak signals extracted in the first and second periods and the corresponding angle.

(8) According to another aspect of the embodiments of the present invention, there is provided a signal processing method of extracting peak signals which are obtained from a difference frequency between a transmission signal of which a frequency changes with a predetermined cycle and a reception signal obtained by receiving a reflected wave coming from a target at which a transmission wave corresponding to the transmission signal is reflected, in a first period in which the frequency of the transmission signal ascends and in a second period in which the frequency descends, and deriving information of the target on the basis of the extracted peak signals, the signal processing method comprising: (a) predicting this time peak signal based on a peak signal obtained in previous time; and (b) extracting this time peak signal corresponding to the predicted peak signal from peak signals existing within a predetermined frequency range, wherein the step (b) is executed with the frequency range being extended when this time peak signal corresponding to the predicted peak signal does not exist within the predetermined frequency range.

According to the aspects defined in (1) to (8), when this time peak signal corresponding to the predicted peak signal does not exist in the predetermined frequency range, the frequency range is extended. Therefore, even when this time peak signal corresponding to the predicted peak signal deviates from the predetermined range, it is possible to extract the peak signal.

Also, in particular, according to the aspect defined in (2), when an angle cannot be derived from the peak signal, the frequency range of the peak signal to be extracted is extended. Thus, it is possible to derive the angle from the further extracted peak signal.

Also, in particular, according to the aspect defined in (3), when an angle cannot be derived from the peak signal or when the derived angle deviates, the frequency range of the peak signal to be extracted is extended. Thus, it is possible to derive the angle from the further extracted peak signal.

Also, in particular, according to the aspect defined in (4), when an angle derived from the peak signal of at least one of the first and second periods deviates, it is possible to derive the angle from the further extracted peak signal for the corresponding period.

Also, in particular, according to the aspect defined in (5), when the frequency range within which the peak signals are extracted is extended, a noise and the like other than a desired peak signal may be extracted. However, the predetermined value of the angle is made to be small, so that it is possible to reduce the possibility.

Also, in particular, according to the aspect defined in (6), since the frequency range has the frequency of the predicted peak signal as a center of the range, it is possible to effectively extract this time peak signal corresponding to the predicted peak signal.

Also, according to the aspect defined in (7), even though the angle of the peak signal extracted in any one of the first and second periods is not an angle corresponding to the predicted peak signal, when a frequency of the peak signal is extracted, the information of the target is derived using the frequency. Thereby, it is possible to derive the information having higher precision than a case where a frequency of the predicted peak signal is used. Also, when an angle of the peak signal extracted in any one period corresponds to the angle of the predicted peak signal, the information of the target is derived on the basis of only the angle. Thereby, it is possible to derive the information having higher precision than a case where an angle of the predicted peak signal is used, for example.

BRIEF DESCRIPTION OF THE DRAWINGS

In the accompanying drawings:
FIG. 13 is a flow chart showing second normal hysteresis peak determination processing;
FIG. 15 is a flow chart showing processing of deriving a distance, a relative speed and the like.

DETAILED DESCRIPTION OF THE EMBODIMENTS

Hereinafter, illustrative embodiments of the invention will be described with reference to the drawings.

1. First Illustrative Embodiment 1-1. Configuration

Figure 1:
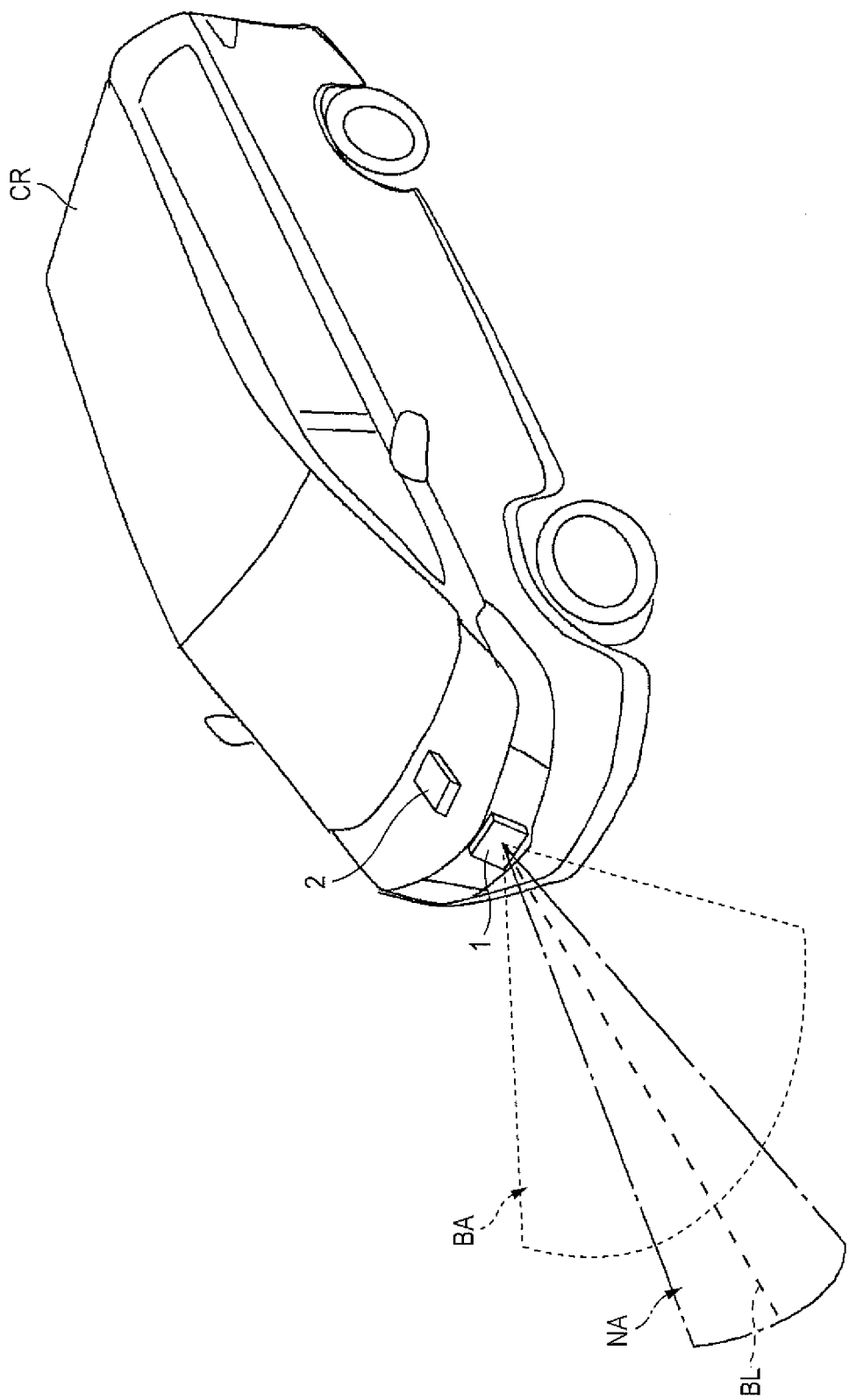
FIG. 1 is an overall view of a vehicle.

FIG. 1 is an overall view of a vehicle CR. The vehicle CR mainly has a radar apparatus 1 and a vehicle control device 2, which are included in a vehicle control system 10 of this illustrative embodiment. The vehicle CR has the radar apparatus 1 in the vicinity of a front bumper of the vehicle. The radar apparatus 1 scans a predetermined scanning scope by one scanning to thus derive a distance between the vehicle CR and a target in a vehicle traveling direction, i.e., a distance (hereinafter, referred to as a 'longitudinal distance') until a reflected wave from the target arrives at a reception antenna of the radar apparatus 1. Also, the radar apparatus 1 derives a distance between the vehicle CR and the target in a vehicle transverse direction (a vehicle width direction), i.e., a distance (hereinafter, referred to as a 'transverse distance') of the target with respect to the vehicle CR in a direction substantially orthogonal to a reference axis BL virtually extending in the traveling direction of the vehicle CR. In the meantime, the transverse distance is derived by performing a trigonometric function calculation for information on an angle of the target with respect to the vehicle CR. In this way, the radar apparatus 1 derives the position information of the target with respect to the vehicle CR. Also, the radar apparatus 1 derives a relative speed that is a speed of the target relative to a speed of the vehicle CR.

In the meantime, FIG. 1 shows beam patterns of transmission waves that are transmitted from two transmission antennas (a transmission antenna 13a and a transmission antenna 13b shown in FIG. 2) of the radar apparatus 1, which will be described later. When the reference axis BL is ±0°, a beam pattern NA of the transmission wave that is output from the transmission antenna 13a has a narrower angle range (for example, ±6°) than a beam pattern BA of the transmission wave, which is output from the transmission antenna 13b, and is output in the shape of a sharp beam pattern having a long longitudinal distance. The reason why the longitudinal distance is long is that an output level of outputting the transmission wave is relatively high.

In contrast, the beam pattern BA of the transmission wave that is output from the transmission antenna 13b has a wider angle range (for example, ±10°) than the beam pattern NA of the transmission wave that is output from the transmission antenna 13a, and is output in the shape of a broad beam pattern having a short longitudinal distance. The reason why the longitudinal distance is short is that an output level of outputting the transmission wave is relatively low. In each of a transmission period in which the transmission wave is output from the transmission antenna 13a and a transmission period in which the transmission wave is output from the transmission antenna 13b, the transmission waves of different beam patterns are output, so that it is possible to prevent an error of an angle derivation, which is caused due to a phase fold-back of the target. Processing of deriving a target angle will be described later.

Also, the radar apparatus 1 of FIG. 1 is mounted in the vicinity of the front bumper of the vehicle. However, the radar apparatus may be mounted to another part, for example in the vicinity of a rear bumper of the vehicle CR and in the vicinity of a side mirror of the vehicle CR without being limited to the vicinity of the front bumper, inasmuch as it is possible to derive a target in accordance with a control object of the vehicle CR of the vehicle control device 2 at the corresponding mount position.

Also, the vehicle CR has the vehicle control device 2 in the vehicle CR. The vehicle control device 2 is an ECU (Electronic Control Unit) that controls respective devices of the vehicle CR.

Figure 2:
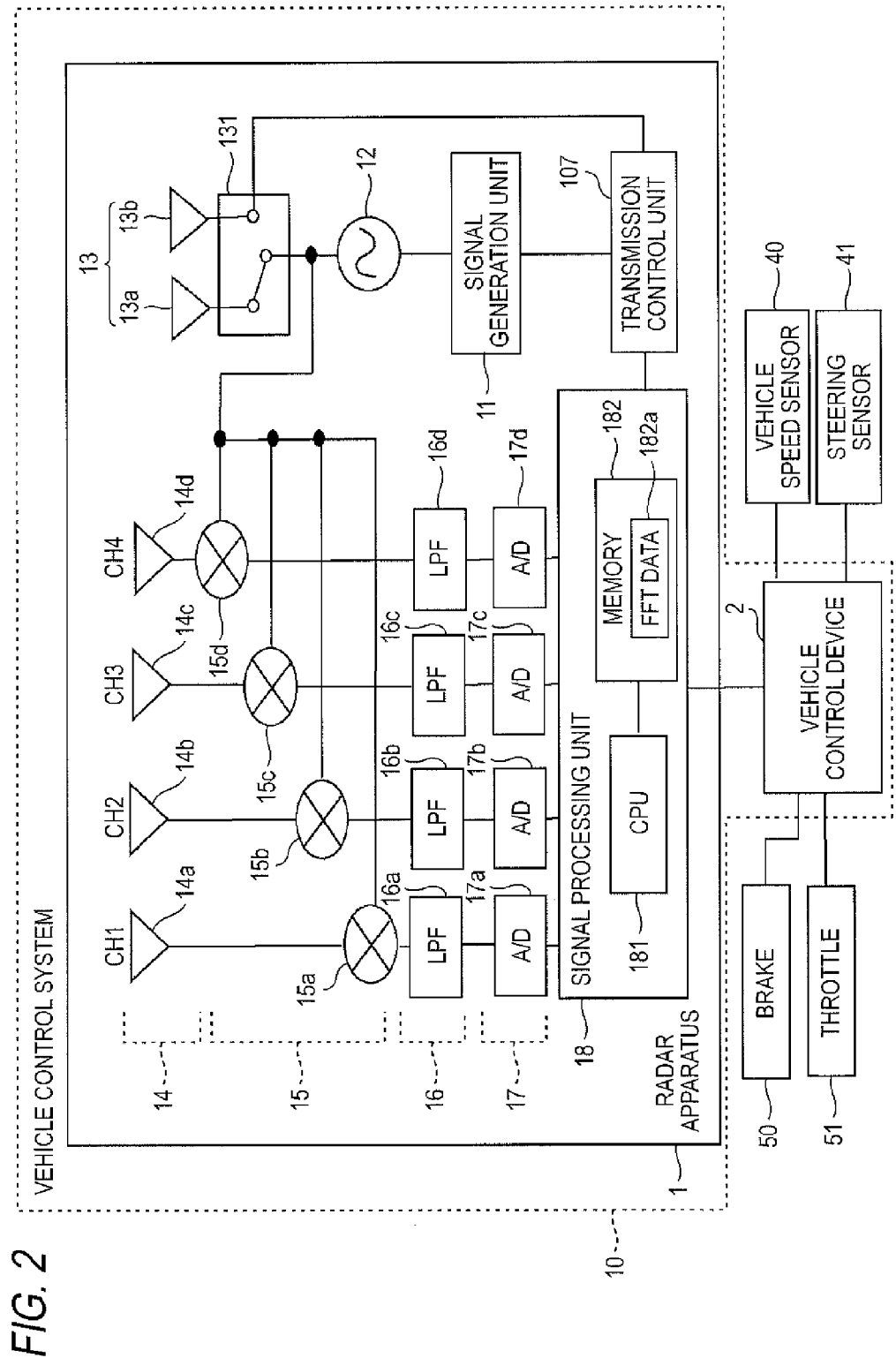
FIG. 2 is a block diagram of a vehicle control system.

FIG. 2 is a block diagram of the vehicle control system 10. The vehicle control system 10 is configured so that the radar apparatus 1 and the vehicle control device 2 are electrically connected and the target information on the position and the relative speed, which are usually derived from the radar apparatus 1, is output to the vehicle control device 2. That is, the radar apparatus 1 outputs the target information, which is the information on the longitudinal distance, transverse distance and relative speed of the target with respect to the vehicle CR, to the vehicle control device 2. Then, the vehicle control device 2 controls operations of the various devices of the vehicle CR, based on the target information. Also, the vehicle control device 2 is electrically connected to a variety of sensors provided to the vehicle CR, such as a vehicle speed sensor 40 and a steering sensor 41. Also, the vehicle control device 2 is electrically connected to a variety of devices provided to the vehicle CR, such as a brake 50 and a throttle 51.

The radar apparatus 1 mainly has a signal generation unit 11, an oscillator 12, a transmission antenna 13, a reception antenna 14, a mixer 15, an LPF (Low Pass Filter) 16, an AD (Analog to Digital) converter 17 and a signal processing unit 18.

The signal generation unit 11 generates a modulation signal of which a voltage changes in a triangular wave shape, for example, based on a control signal of a transmission control unit 107 that will be described later.

The oscillator 12 is a voltage control oscillator that controls an oscillation frequency with a voltage, frequency-modulates a predetermined frequency signal (for example, 76.5 GHz), based on the modulation signal generated from the signal generation unit 11, and outputs the same to the transmission antenna 13, as a transmission signal of a frequency band of which a central frequency is 76.5 GHz.

The transmission antenna 13 outputs a transmission wave relating to the transmission signal to the outside of the vehicle. In this illustrative embodiment, the radar apparatus 1 has two transmission antennas of the transmission antenna 13a and the transmission antenna 13b. The transmission antennas 13a, 13b are switched with a predetermined cycle by a switching operation of a switching unit 131, and the transmission wave is consecutively output to the outside of the vehicle from the transmission antenna 13 connected to the oscillator 12. The transmission antenna 13a and the transmission antenna 13b have different arrangements (antenna patterns) of antenna devices. Thereby, as shown in FIG. 1, the beam patterns of the transmission waves that are transmitted from the transmission antennas 13a, 13b are different.

The switching unit 131 is a switch for switching the transmission antenna 13 that is connected to the oscillator 12 and connects any one of the transmission antenna 13a and the transmission antenna 13b and the oscillator 12 to each other in response to a signal of the transmission control unit 107.

The reception antenna 14 is a plurality of array antennas that receives the reflected waves coming from an object at which the transmission waves consecutively transmitted from the transmission antenna 13 are reflected. In this illustrative embodiment, the four reception antennas 14a (ch1), 14b (ch2), 14c (ch3) and 14d (ch4) are provided. In the meantime, each of the reception antennas 14a to 14d is arranged at an equal interval.

The mixer 15 is provided for each reception antenna. The mixer 15 mixes a reception signal and a transmission signal. The reception signal and the transmission signal are mixed, so that a beat signal, which is a difference signal between the reception signal and the transmission signal, is generated and is then output to the LPF 16.

Here, the reception signal and the transmission signal generating the beat signal are described with reference to an FW-CW (Frequency Modulated Continuous Wave) signal processing method shown in FIG. 3. Meanwhile, in this illustrative embodiment, the FW-CW method is described below. However, the invention is not limited to the FW-CW method and any method can be adopted inasmuch as the method derives a target by combining a plurality of sections including an UP section in which the frequency of the transmission signal ascends and a DOWN section in which the frequency of the transmission signal descends.

Also, symbols that are shown in equations and FIG. 3 for signals and beat frequencies of the FW-CW are as follows: distance frequency, fd: speed frequency, fo: central frequency of transmission wave, ΔF: frequency shift width, fm: repetition frequency of modulation wave, c: light speed (speed of electric wave), T: round-trip time of electric wave between vehicle CR and target, fs: transmission/reception frequency, R: longitudinal distance, V: relative speed, θm: angle of target, θup: angle corresponding to a peak signal in an UP section, θdn: angle corresponding to a peak signal in a DOWN section.

Figure 3:
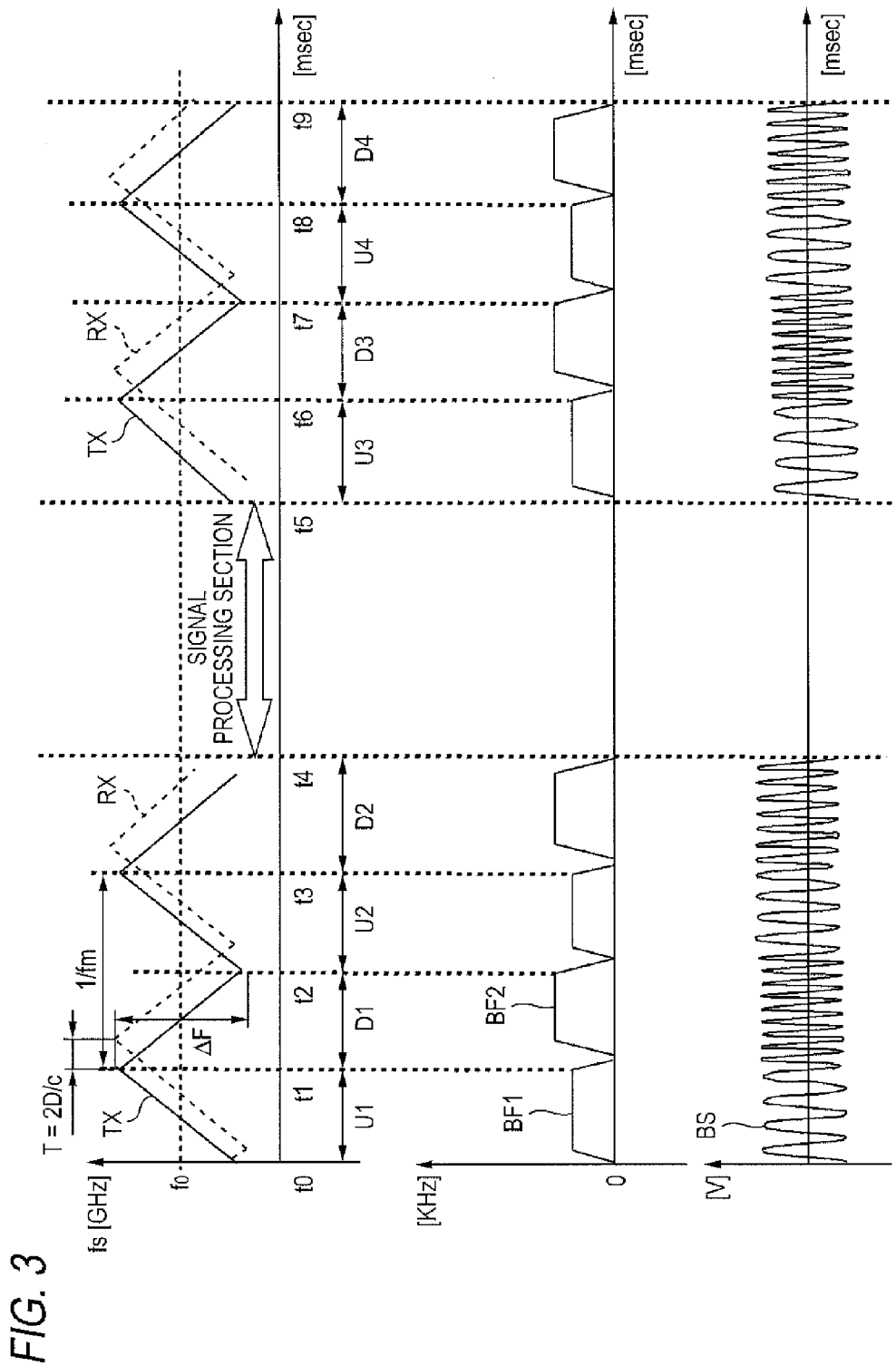
FIG. 3 is a view showing a signal of an FW-CW method.

FIG. 3 is a view showing a signal of the FW-CW method. At the upper of FIG. 3, signal waveforms of a transmission signal TX and a reception signal RX of the FW-CW method are shown, and a vertical axis indicates a frequency [GHz] and a horizontal axis indicates a time [msec]. The transmission signal TX has a central frequency fo (for example, 76.5 GHz) and repeats a constant change between 200 MHz so that it ascends up to a predetermined frequency (for example, 76.6 GHz) and then descends to a predetermined frequency (for example, 76.4 GHz). Like this, the transmission signal has a section (hereinafter, also referred to as 'UP section', for example, sections U1, U2, U3, U4 shown in FIG. 3 are UP sections) in which the frequency ascends to a predetermined frequency and a section (hereinafter, also referred to as 'DOWN section', for example, sections D1, D2, D3, D4 are DOWN sections) in which the frequency descends to a predetermined frequency after it has ascended to the predetermined frequency. Also, when the transmission wave transmitted from the transmission antenna 13 collides with an object and is then received at the reception antenna 14 as a reflected wave, the reception signal RX is input into the mixer 15 through the reception antenna 14. Like the transmission signal TX, the reception signal RX also has a section in which the frequency ascends to a predetermined frequency and a section in which the frequency descends to a predetermined frequency.

In the meantime, the radar apparatus 1 of this illustrative embodiment transmits a transmission wave, which corresponds to two cycles of the transmission signal TX in which one cycle of the transmission signal TX is a combination of one UP section and one DOWN section, to the outside of the vehicle. For example, in a first cycle (an UP section U1 of transmission time t0 to t1 and a DOWN section D1 of transmission time t1 to t2), a transmission wave having the beam pattern NA is output from the transmission antenna 13a. In a second cycle (an UP section U2 of transmission time t2 to t3 and a DOWN section D2 of transmission time t3 to t4) that is a next cycle, a transmission wave having the beam pattern BA is output from the transmission antenna 13b. Then, the signal processing unit 18 performs signal processing for deriving target information by the transmission signal TX and the reception signal RX (a signal processing section of time t4 to t5). After that, in a third cycle (an UP section U3 of transmission time t5 to t6 and a DOWN section D3 of transmission time t6 to t7), a transmission wave having the beam pattern NA is output from the transmission antenna 13a, in a fourth cycle (an UP section U4 of transmission time t7 to t8 and a DOWN section D4 of transmission time t8 to t9), a transmission wave having the beam pattern BA is output from the transmission antenna 13b and then the signal processing unit 18 performs the signal processing for deriving target information. Thereafter, the same processing is repeated.

In the meantime, the reception signal RX has a temporal delay (time T), compared to the transmission signal TX, depending on the distance between the target and the vehicle CR. Also, when there is a speed difference between a speed of the vehicle CR and a speed of the target, a difference corresponding to a Doppler shift is caused in the reception signal RX relative to the transmission signal TX.

At the middle of FIG. 3, a beat frequency resulting from a difference between the transmission signal TX and the reception signal RX is shown, and a vertical axis indicates a frequency [kHz] and a horizontal axis indicates time [msec]. For example, in the section U1, a beat frequency BF1 is derived, and in the section D1, a beat frequency BF2 is derived. In this way, the beat frequency is derived in each section.

At the lower of FIG. 3, a beat signal corresponding to the beat frequency is shown, a vertical axis indicates an amplitude [V] and a horizontal axis indicates time [msec]. In FIG. 3, an analog beat signal BS corresponding to the beat frequency is shown. The beat signal BS is filtered in the LPF 16 that will be described later and is then converted into digital data by the AD converter 17. Meanwhile, FIG. 3 shows the beat signal BS corresponding to the reception signal RX that is received from one reflection point. However, when the transmission wave corresponding to the transmission signal TX is reflected at a plurality of reflection points and is received at the reception antenna 14 as a plurality of reflected waves, signals corresponding to the reflected waves are generated as the reception signal RX. In this case, the beat signal BS indicating a difference between the transmission signal TX and the reception signal RX is a signal that is obtained by combining respective differences between the plurality of reception signals RX and the transmission signal TX.

After the beat signal BS is converted into the digital data by the AD converter 17, the digital data is FFT-processed for each of the UP and DOWN sections by the signal processing unit 18, so that FFT data having a signal level value and phase information is acquired for each frequency of the beat signal BS. Also, the FFT data is acquired for each of the reception antennas 14a to 14d.

The longitudinal distance, relative speed and transverse distance of the target with respect to the vehicle CR are derived using the plurality of FFT data derived as described above. Particularly, regarding the derivation of the angle, when a calculation method such as a spatial average is performed, the plurality of FFT data is used for the calculation, so that it is possible to derive the correct angle information.

The longitudinal distance of the target with respect to the vehicle CR is derived by an equation (1) and the relative speed of the target relative to the vehicle CR is derived by an equation (2). Also, the angle of the target with respect to the vehicle CR is derived by an equation (3). From the angle derived by the equation (3) and the longitudinal distance information of the target, the transverse distance of the target with respect to the vehicle CR is derived by a calculation using a trigonometric function.

[Equation 1]

$$R = \frac{(f_{up} + f_{dn}) \cdot c}{2 \times (4 \times \Delta F \times f_n)} \quad (1)$$

[Equation 2]

$$V = \frac{(f_{up} - f_{dn}) \cdot c}{2 \times (4 \times \Delta F \times f_m)} \quad (2)$$

[Equation 3]

$$\theta_m = \frac{\theta_{up} + \theta_{dn}}{2} \quad (3)$$

Returning back to FIG. 2, the LPF (Low Pass Filter) 16 is a filter that reduces a frequency component higher than a predetermined frequency without reducing a frequency component lower than the predetermined frequency. In the meantime, like the mixer 15, the LPF 16 is provided for each reception antenna.

The AD converter 17 samples the beat signal, which is an analog signal, with a predetermined cycle, thereby deriving a plurality of sampling data. Then, the AD converter quantizes the sampled data to thus convert the beat signal of the analog data into digital data, thereby outputting the digital data to the signal processing unit 18. In the meantime, the AD converter 17 is also provided for each reception antenna, like the mixer 15.

The signal processing unit 18 is a computer having a CPU 181 and a memory 182, performs the FFT processing for the beat signal of the digital data output from the AD converter 17 to thus acquire the FFT data and extracts a signal having a signal level value exceeding a predetermined threshold from the beat signal of the FFT data, as a peak signal. The signal processing unit 18 derives the target information of the target by pairing the peak signal of the UP section and the peak signal of the DOWN section. Also, the signal processing unit 18 performs processing of determining whether the extracted peak signal is a ghost peak corresponding to a target that does not actually exist and excluding target information corresponding to a peak signal of a ghost from an output object of the radar apparatus.

The memory 182 stores therein execution programs for a variety of calculation processing and the like that are executed by the CPU 181. Also, the memory 182 stores therein the plurality of target information derived by the signal processing unit 18. For example, the memory stores therein the target information (the longitudinal distance, transverse distance and relative speed of the target) derived in past processing and in this time processing. Also, the memory 182 stores therein FFT data 182a that is acquired by the FFT processing. In the FFT data 182a, the FFT data of the past target deriving processing is stored including the FFT data of this time target deriving processing.

The transmission control unit 107 is connected to the signal processing unit 18 and outputs a control signal to the signal generation unit 11 generating a modulation signal, based on a signal from the signal processing unit 18. Also, the transmission control unit 107 outputs a control signal to the switching unit 131, to which any one of the transmission antenna 13a and the transmission antenna 13b and the oscillator 12 are connected, based on a signal from the signal processing unit 18.

The vehicle control device 2 controls operations of various devices of the vehicle CR. That is, the vehicle control device 2 acquires information from the various sensors such as the vehicle speed sensor 40 and the steering sensor 41. The vehicle control device 2 operates a variety of devices such as the brake 50 and the throttle 51 to thus control behaviors of the vehicle CR, based on the information acquired from the various sensors and the target information acquired from the signal processing unit 18 of the radar apparatus 1.

An example of the vehicle control that is performed by the vehicle control device 2 is as follows. The vehicle control device 2 performs control of enabling the vehicle CR to follow up a preceding vehicle that is traveling at the front of the vehicle CR in an own traffic lane in which the vehicle CR is traveling. Specifically, as the vehicle CR travels, the vehicle control device 2 performs ACC (Adaptive Cruise Control) control of controlling at least one of the brake 50 and the throttle 51 and thus enabling the vehicle CR to follow up the preceding vehicle at a state where a predetermined inter-vehicular distance is secured between the vehicle CR and the preceding vehicle.

Also, an example of the vehicle control that is performed by the vehicle control device 2 includes performing control of protecting a passenger in the vehicle CR, in preparation for collision of the vehicle CR with an obstacle. Specifically, when there is a danger that the vehicle CR will collide with an obstacle, the vehicle control device performs the PCS (Pre-Crash Safety System) control of displaying a warning by using a warning device (not shown) to a user of the vehicle CR or controlling the brake 50 to thus lower the speed of the vehicle CR. Also, the vehicle control device 2 performs the PCS control of fastening a passenger to a seat by a seat belt in the vehicle or fixing a headrest to thus reduce damage to a user of the vehicle CR, which is caused due to shock upon the collision.

The vehicle speed sensor 40 outputs a signal corresponding to the speed of the vehicle CR, based on the number of revolutions of an axle of the vehicle CR. The vehicle control device 2 acquires a current vehicle speed, based on the signal from the vehicle speed sensor 40.

The steering sensor 41 detects a rotating angle of a steering wheel resulting from an operation of a driver of the vehicle CR and transmits the angle information of the vehicle body of the vehicle CR to the vehicle control device 2.

The brake 50 decelerates the speed of the vehicle CR in response to an operation of the driver of the vehicle CR. Also, the brake 50 decelerates the speed of the vehicle CR under control of the vehicle control device 2. For example, the brake decelerates the speed of the vehicle CR so that the distance between the vehicle CR and the preceding vehicle is kept constant.

The throttle 51 accelerates the speed of the vehicle CR in response to an operation of the driver of the vehicle CR. Also, the throttle 51 accelerates the speed of the vehicle CR under control of the vehicle control device 2. For example, the throttle 51 accelerates the speed of the vehicle CR so that the distance between the vehicle CR and the preceding vehicle is kept constant.

1-2. Overall Processing

Figure 4:
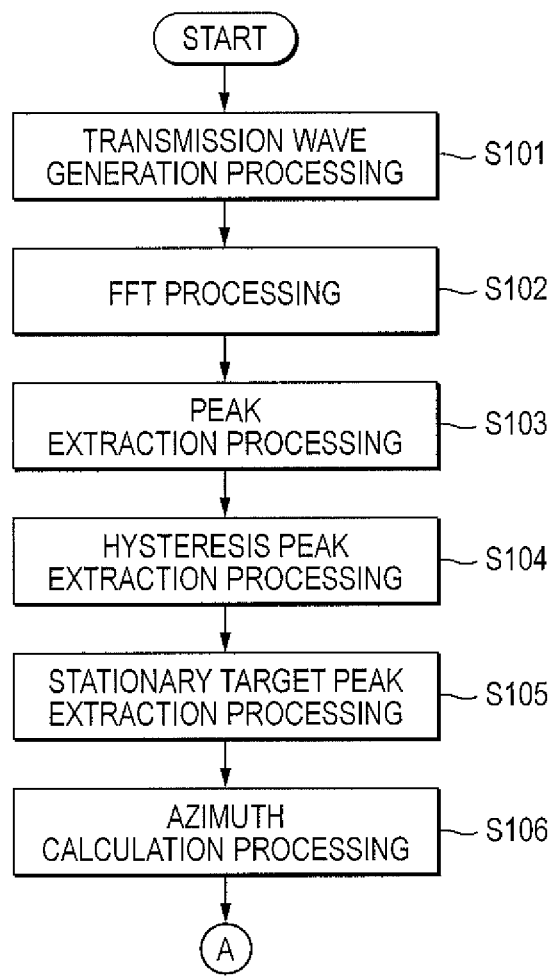
FIG. 4 is a flow chart showing target information deriving processing.
Figure 5:
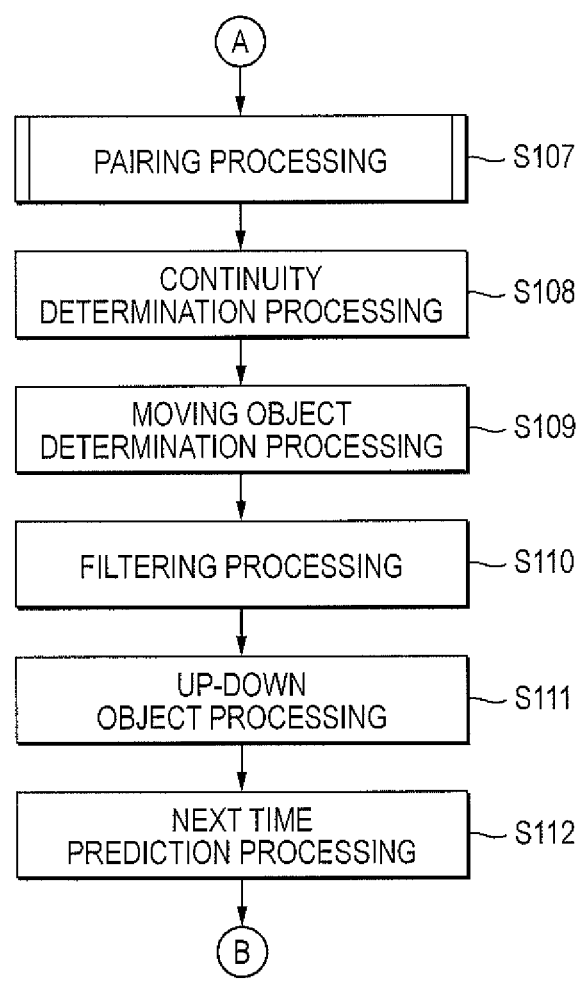
FIG. 5 is a flow chart showing the target information deriving processing.
Figure 6:
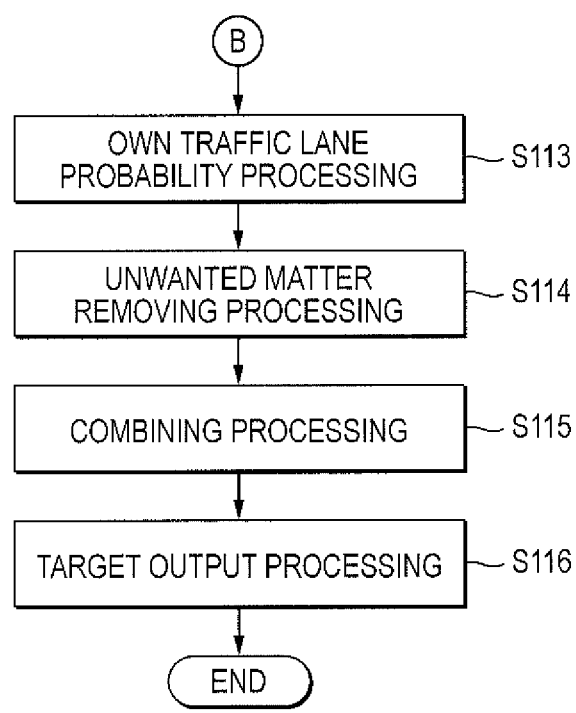
FIG. 6 is a flow chart showing the target information deriving processing.

FIGS. 4 to 6 are flow charts of target information deriving processing that is executed by the signal processing unit 18. First, the signal processing unit 18 outputs an instruction signal for generating a transmission wave to the transmission control unit 107 (step S101). Then, the signal generation unit 11 is controlled by the transmission control unit 107 to which the instruction signal is input from the signal processing unit 18, and a transmission wave corresponding to the transmission signal TX is generated. The generated transmission wave is output to the outside of the vehicle.

Then, the reception antenna 14 receives a reflected wave coming from a target at which the transmission wave is reflected, and the reception signal RX corresponding to the reflected wave and the transmission signal TX are mixed by the mixer 15, so that a beat signal, which is a difference signal between the transmission signal and the reception signal, is generated. Then, the beat signal BS that is an analog signal is filtered by the LPF 16, is converted into digital data by the AD converter 17 and is then input to the signal processing unit 18.

The signal processing unit 18 performs the FFT processing for the beat signal of the digital data (step S102) and acquires the FFT data having signal level values of the beat signals with respect to each frequency.

Then, the signal processing unit 18 extracts, as a peak signal, a beat signal having a signal level value exceeding a predetermined threshold from the beat signals of the FFT data (step S103). Meanwhile, in this processing, the peak signals of all sections of the UP sections and the DOWN sections corresponding to the two cycles of the transmission period are extracted and the number of peak signals is decided.

Then, the signal processing unit 18 performs hysteresis peak extraction processing of extracting a peak signal having temporal continuity with a target derived in the past target deriving processing from the peak signals extracted in the peak extraction processing (step S104).

Then, from the speed information of the vehicle CR output from the vehicle speed sensor 40, the signal processing unit 18 performs processing of extracting a peak signal of each section, in which a frequency difference between the peak signal of the UP section and the peak signal of the DOWN section corresponds to the speed, as a peak signal corresponding to a stationary object (step S105). Here, the stationary object means a target having the substantially same relative speed as the speed of the vehicle CR. Also, a target that moves at a specific speed and has a different relative speed from the speed of the vehicle CR is hereinafter referred to as a moving object.

In the meantime, the reason to perform the hysteresis peak extraction (step S104) and the stationary object peak extraction (step S105) is that the signal processing unit 18 is to select a peak signal corresponding to a target that should be preferentially output to the vehicle control device 2. For example, the peak signal of the target of this time processing having temporal continuity with the target derived in the previous time processing may have a high priority because there is a high probability that a target actually exists, compared to a newly derived target that has not been derived in the previous time processing, and also may have a high priority because a peak signal corresponding to a moving object has a high possibility that the moving object will collide with the vehicle CR, compared to a peak signal corresponding to a stationary object.

In each of the UP and DOWN sections, the signal processing unit 18 performs an azimuth calculation, based on the peak signals (step S106). Specifically, the signal processing unit 18 derives an azimuth (angle) of the target by a predetermined azimuth calculation algorithm. For example, the azimuth calculation algorithm is an ESPRIT (Estimation of Signal Parameters via Rotation Invariance Techniques), calculates an eigenvalue of a correlation matrix, an eigenvector and the like from the phase information of the reception signals received at the respective reception antennas 14a to 14d and derives an angle θup corresponding to a peak signal of the UP section and an angle θdn corresponding to a peak signal of the DOWN section. When the respective peak signals of the UP and DOWN sections are paired, an angle of the target is derived by the equation (3). Also, the frequency information of one peak signal corresponds to the information on the distance and relative speed of the target. However, the frequency of one peak signal may include a plurality of target information. For example, regarding the position information of the target with respect to the vehicle CR, a plurality of target information of which the distances are the same and the angles are different may be included in the peak signal of the same frequency. In this case, the phase information of a plurality of reflected waves coming at different angles becomes different phase information, respectively. Therefore, the signal processing unit 18 derives a plurality of target information existing at different angles for one peak signal, based on the phase information of the respective reflected waves.

Here, when performing the azimuth calculation, a phase may be 360°-rotated depending on the angle of the target, so that information of an angle different from an original angle at which the target exists may be derived. Specifically, for example, when the phase information of the reflected wave from a target, which is received at the reception antenna, is 420°, even though an actual target exists in the area of the beam pattern BA, other than the beam pattern NA shown in FIG. 1, the actual target may be determined that the phase information is 60° (420°-360°) due to the phase fold-back, and false angle information that the target exists in the area of the beam pattern NA not included in the beam pattern BA may be derived. Therefore, the transmission waves of the two beam patterns are output from the transmission antennas 13a, 13b, so that a correct angle of the target is derived.

Specifically, an angle is derived as follows, based on the reflected waves with respect to the transmission waves of the respective beam patterns. When the phase information of the reflected wave is 60°, the signal level values of angle spectra corresponding to the reflected wave of the transmission wave output from the transmission antenna 13a and the reflected wave of the transmission wave output from the transmission antenna 13b are compared. When the signal level value of the angle spectrum corresponding to the reflected wave of the transmission wave output from the transmission antenna 13a is larger, an angle corresponding to the phase information of 60° in the area of the beam pattern NA except for the area of the beam pattern BA is derived as a target angle. Also, when the signal level value of the angle spectrum corresponding to the reflected wave of the transmission wave output from the transmission antenna 13b is larger, an angle corresponding to the phase information of 420° in the area of the beam pattern BA except for the area of the beam pattern NA is derived as a target angle. In this way, by the transmission waves of two cycles of the transmission signal TX, the transmission waves of the different beam patterns are output every cycle, so that it is possible to prevent the false angle information of the target from being derived due to the phase fold-back upon the azimuth calculation.

Then, the signal processing unit 18 performs pairing processing of pairing the peak signals of the UP and DOWN sections (step S107). For the hysteresis peak signals extracted in the hysteresis peak extraction processing (step S104) from all the peak signals derived in the processing of step S103, the pairing processing is performed between the hysteresis peak signal of the UP section and the hysteresis peak signal of the DOWN section. Also, for the stationary object peak signal extracted in the stationary object peak extraction processing (step S105), the pairing processing is performed between the stationary object peak signal of the UP section and the stationary object peak signal of the DOWN section. Also, for the other peak signals except for the hysteresis peak signals and stationary object peak signals of all the peak signals extracted in the peak extraction processing, the pairing processing is performed between the other peak signals of the UP section and the other peak signals of the DOWN section.

In the meantime, the pairing processing between the peak signal of the UP section and the peak signal of the DOWN section is performed through a calculation of using a Mahalanobis distance, for example. Specifically, a plurality of normal-paired data paired in a correct combination and mis-paired data paired in an incorrect combination during the experimental pairing between the peak signal of the UP section and the peak signal of the DOWN section before the radar apparatus 1 is mounted on the vehicle CR is acquired. Then, from three parameter values of 'a difference of signal level values', 'a difference of angle values' and 'a difference of signal level values of angle spectra' between the peak signal of the UP section and the peak signal of the DOWN section in the plurality of normal-paired data, average values are derived for each of the three parameters of the plurality of normal-paired data and are then stored in the memory 182 in advance.

After the radar apparatus 1 is mounted on the vehicle CR, when the signal processing unit 18 derives the target information, it derives a Mahalanobis distance with an equation (4) by using the three parameter values of all combinations of the peak signals of the UP section and the peak signals of the DOWN section of the peaks signals of the FFT data acquired in this time processing and the average values for each of the three parameters of the plurality of nounal-paired data. The signal processing unit 18 derives, as the normal-paired data, paired data of this time processing having a minimum Mahalanobis distance. Here, the Mahalanobis distance is a distance for one group expressed by a multivariable vector $x=(x1, x2, x3)$ where an average $\mu=(\mu 1, \mu 2, \mu 3)^T$ and a covariance matrix is $\Sigma$, and is derived by the equation (4). In the meantime, $\mu 1$, $\mu 2$ and $\mu 3$ indicate the three parameter values of the normal-paired data and x1, x2 and x3 indicate the three parameter values of the paired data of this time processing.

$$D_M(x)=\sqrt{(x-\mu)^T\Sigma^{-1}(x-\mu)} \quad (4)$$

Then, the signal processing unit 18 derives a transverse distance, based on the longitudinal distance, relative distance and angle of the normal-paired data, by using the parameter values of the normal-paired data in the pairing processing and the equations (1) to (3). In the meantime, the detailed pairing processing using the hysteresis peak signal will be described later.

Then, the signal processing unit 18 performs continuity determination processing of determining whether there is a temporally continuous relation between this time paired data paired in this time target deriving processing and previous time paired data paired in the previous time processing (step S108). Here, a case where there is a temporally continuous relation (there is a continuity) between both the paired data is a case where predicted paired data, which is obtained by predicting this time paired data based on previous time paired data, is generated and difference values of the longitudinal distances, transverse distances and relative speeds included in this time paired data and the predicted paired data are within predetermined values. In this case, it is determined that the target derived in this time processing and the target derived in the past processing are the same target. In the meantime, when the plurality of this time paired data is within the predetermined values, the signal processing unit 18 determines that this time paired data, which has the smallest difference value between the predicted paired data and this time paired data, has a temporally continuous relation with the target information of the previous time processing.

Also, when the difference values of the longitudinal distances, transverse distances and relative speeds included in this time paired data and the predicted paired data are not within predetermined values, the signal processing unit 18 determines that there is no temporally continuous relation (there is no continuity) between this time paired data and the previous time target information. The paired data for which it is determined that there is no continuity becomes a target (hereinafter, referred to as 'new paired data') that is first derived in this time target deriving processing. In the meantime, since the new paired data has no predicted paired data, the distance, relative speed, angle and signal level value of the new paired data become information on the distance, relative speed, angle and signal level value of one target in this time target deriving processing, in the filter processing and the like that will be described later. Also, when it is determined in the continuity determination that the continuity exists consecutively a predetermined number of times (i.e., when it is determined as the same target), the signal processing unit 18 also performs processing of deciding the detected target as a true target.

Then, the signal processing unit 18 derives paired data corresponding to the moving object from the information of the speed of the vehicle CR and the relative speed of the paired data (step S109). By this processing, it is possible to determine the paired data that should be preferentially processed.

When there is a temporally continuous relation between this time paired data and the predicted paired data, the signal processing unit 18 performs filtering of the longitudinal distances, relative speeds, transverse distances and signal level values included in this time paired data and the predicted paired data (S110) and derives the filtered paired data (hereinafter, referred to as 'past correspondence paired data') as the target information of this time processing.

For example, when there is a temporally continuous relation between this time paired data and the predicted paired data, the signal processing unit 18 performs weighting of a value 0.75 for the transverse distance of the predicted paired data and weighting of value 0.25 for the transverse distance of this time paired data as regards the transverse distance and derives a sum of both values as a transverse distance of the past correspondence paired data of this time target deriving processing. In the meantime, the filtering processing is also performed for the longitudinal distance, relative speed and signal level value.

Then, the signal processing unit 18 performs up-down object processing of deriving a stationary object that is not necessary as regards the control of the vehicle CR (step S111). Specifically, the signal processing unit derives a stationary object (for example, a road marker of a cantilever or door-type provided above a roadway) having a position in a vehicle height direction of the vehicle CR that is higher than a predetermined height (for example, higher than the vehicle height of the vehicle CR). Also, the signal processing unit derives a stationary object (for example, a road rivet such as chatter bar having a reflection plate attached thereto that is provided at a center divider or curve of a road) having a position lower than the vehicle height of the vehicle CR. The target information of the stationary object derived as described above is removed in an unwanted matter removing processing (which will be described later) and is not output to the vehicle control device 2 from the radar apparatus 1, as the target information.

In processing (next time processing) that is performed next this time processing, the signal processing unit 18 derives predicted values (predicted longitudinal distance, predicted relative speed, predicted transverse distance and the like) of next time target data, which are used in the hysteresis peak extraction processing (step S104). Specifically, the signal processing unit derives 20 target information having a high priority when performing the vehicle control, calculates predicted values of the peak signals of the respective UP and DOWN sections and uses the predicted values in the hysteresis peak deriving processing of next time processing. Regarding the priority, when performing the ACC control, a target having a transverse position equivalent to an own traffic lane in which the vehicle CR is traveling and having a relatively short longitudinal distance to the vehicle CR has a high priority and a target having a transverse position equivalent to an adjacent traffic lane and a relatively long longitudinal distance to the vehicle CR has a low priority. Also, when performing the PCS control, a target having a relatively short time-to-collision ('TTC') has a high priority and a target having a relatively long TTC has a low priority.

Then, the signal processing unit 18 derives a transverse distance of the target corresponding to a curve radius from information on the curve radius of the own traffic lane in which the vehicle CR is traveling and the information on the longitudinal distance and transverse distance of the target. Specifically, the signal processing unit 18 derives the transverse distance (relative transverse distance) of the target with respect to the reference axis BL, which virtually changes in a linear or curved shape depending on the information on the rotating angle of the steering wheel that is input from the steering sensor 41 as a driver of the vehicle CR operates the steering wheel (not shown) of the vehicle CR, and derives a probability that the target exists on the own traffic lane from two-dimensional map data having relative transverse distance and longitudinal distance beforehand stored in the memory 182, as parameters, based on the relative transverse distance and longitudinal distance of the target with respect to the vehicle CR.

Then, the signal processing unit 18 performs processing of removing a target, which is not necessary to be output to the vehicle control device 2, for the target information derived in the past processing (step S114). For example, the signal processing unit 18 removes the target information derived in the up-down object processing of step S111, the target information of a ghost peak corresponding to a target that does not actually exist and caused due to an interference (intermodulation) between a peak signal corresponding to an actual target existing at a predetermined distance or larger and a switching noise of a DC-DC converter of a power supply device of the radar apparatus 1, and the like.

Subsequently, the signal processing unit 18 performs processing of combining a plurality of target information into target information corresponding to one object (step S115). For example, when the transmission wave is emitted from the transmission antenna 13 of the radar apparatus 1 and is reflected on the preceding vehicle, a plurality of reflected waves is received at the reception antenna 14. That is, the reflected waves from a plurality of reflection points of the same object arrive at the reception antenna 14. As a result, the signal processing unit 18 derives a plurality of the target information having different position information, based on the respective reflected waves. However, since the plurality of the target information is originally the target information on one vehicle, the signal processing unit combines the respective target information as one and treats the combined target information as the target information on the same object. For this reason, when the respective relative speeds of the plurality of the target information are substantially the same and the longitudinal distances and transverse distances of the respective target information are within the predetermined ranges, the signal processing unit 18 regards the plurality of the target information as the target information on the same object and performs combining processing of combining the plurality of the target information as the target information corresponding to one target.

Then, the signal processing unit 18 outputs the target information having a high priority with respect to the output to the vehicle control device 2 from the target information combining-processed in the step S115 to the vehicle control device 2 (step S116).

1-3. Pairing Processing

Figure 7:
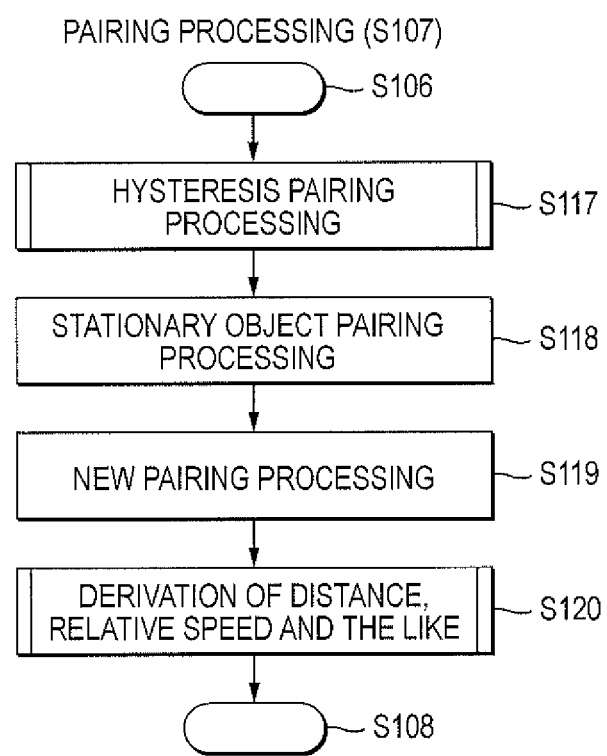
FIG. 7 is a flow chart showing pairing processing.

In the below, the detailed pairing processing (step S107) of this illustrative embodiment is described with reference to FIGS. 7 to 15. FIG. 7 is a flow chart showing the pairing processing. The pairing processing of this illustrative embodiment is processing of pairing peak signals of the UP and DOWN sections extracted in the peak extraction processing (step S103) and deriving the target information on the distance, the relative speed and the like based on the paired data. In the below, the processing is specifically described.

First, the signal processing unit 18 performs hysteresis pairing processing (step S117). The hysteresis pairing processing is pairing processing that is performed for the hysteresis peak, which is extracted in the hysteresis peak extraction processing (step S104), of the peak signals extracted in the peak extraction processing. Also, the hysteresis pairing processing is processing of deriving predicted paired data predicting this time paired data on the basis of paired data (previous time paired data) derived in previous time processing and deriving actual this time paired data by using the predicted paired data.

Specifically, the signal processing unit 18 derives respective peak signals (previous time peak signals) of the previous time paired data by performing opposite processing to the processing of pairing the peak signals to thus derive the paired data. Then, the signal processing unit 18 derives a predicted peak signal predicting this time peak signal, from the previous time peak signal and compares the predicted peak signal and the hysteresis peak signal to thereby extract a hysteresis peak signal corresponding to the predicted peak signal.

That is, the signal processing unit 18 derives peak signals of the UP and DOWN sections (a previous time UP peak signal and a previous time DN peak signal) from the previous time paired data. Then, the signal processing unit derives a predicted UP peak signal predicting a peak signal of this time UP section, from the previous time UP peak signal, and derives a predicted DN peak signal predicting a peak signal of this time DOWN section, from the previous time DN peak signal.

Then, the signal processing unit 18 compares the predicted UP peak signal and the hysteresis peak signal of the UP section to thus extract a hysteresis peak signal (hereinafter, referred to as a 'hysteresis UP peak signal') corresponding to the predicted UP peak signal. Also, the signal processing unit 18 compares the predicted DN peak signal and the hysteresis peak signal of the DOWN section to thereby extract a hysteresis peak signal (hereinafter, referred to as a 'hysteresis DN peak signal') corresponding to the predicted DN peak signal. Then, the signal processing unit derives this time paired data (hereinafter, referred to as 'hysteresis paired data') by filtering the hysteresis UP peak signal and the hysteresis DN peak signal.

Figure 8:
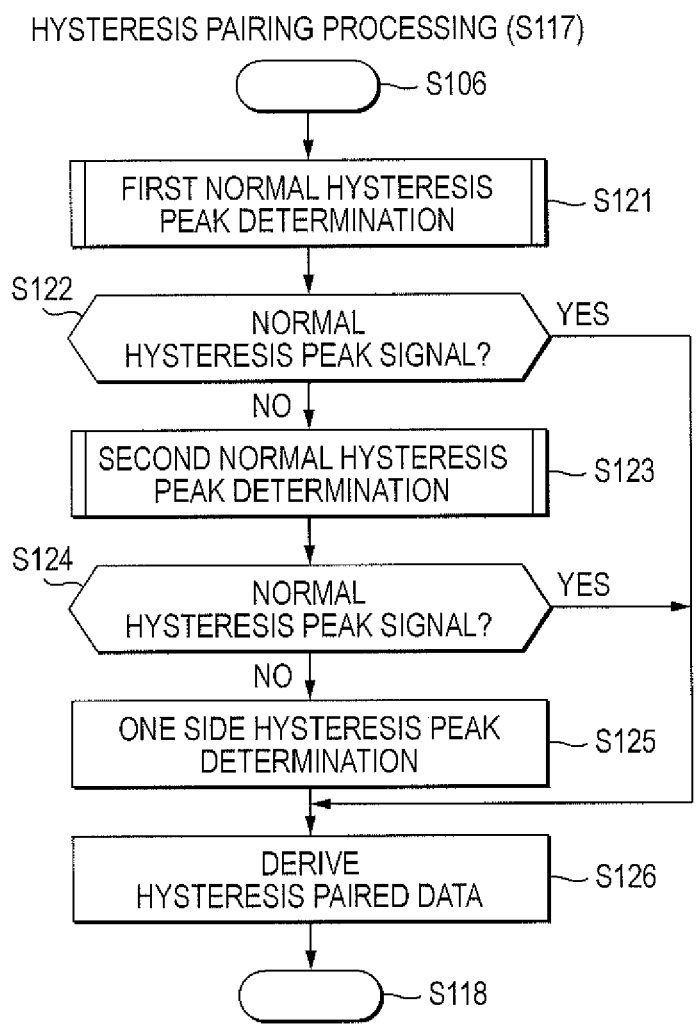
FIG. 8 is a flow chart showing hysteresis pairing processing.

Here, the hysteresis pairing processing is specifically described with reference to FIG. 8. FIG. 8 is a flow chart showing the hysteresis pairing processing. First, the signal processing unit 18 performs first normal hysteresis peak determination processing (step S121). The first normal hysteresis peak determination processing is processing of extracting hysteresis peak signals corresponding to the predicted UP peak signal and predicted DN peak signal from the hysteresis peak signals included within a predetermined frequency range.

Figure 9:
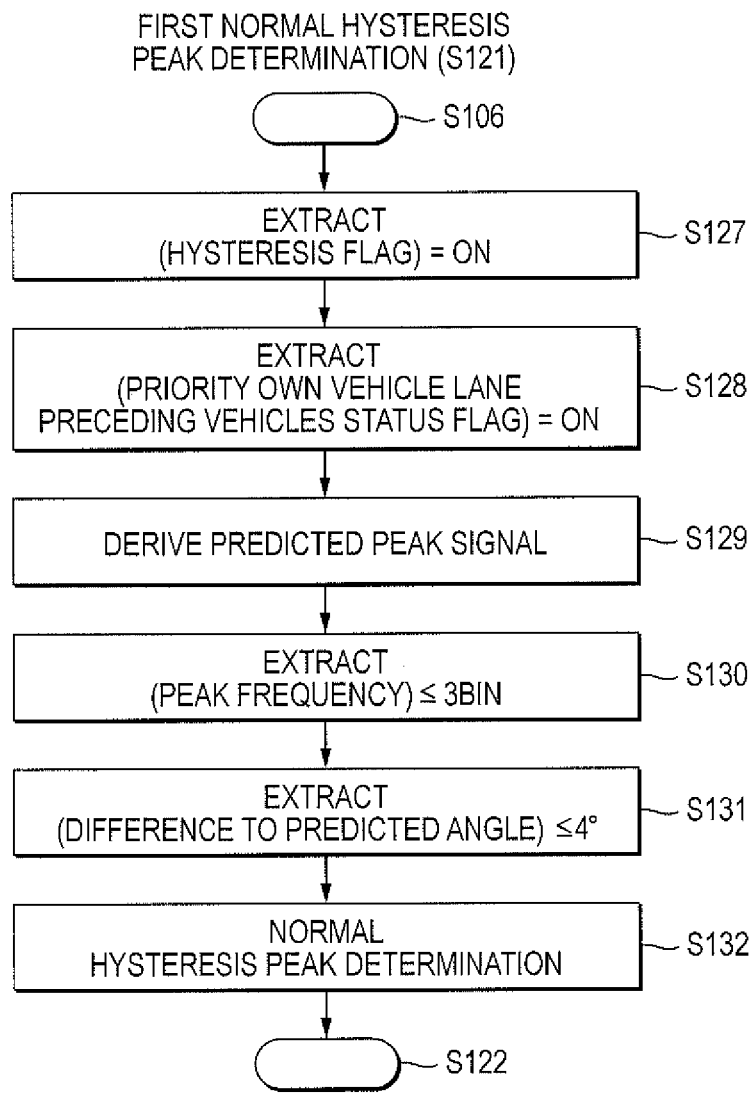
FIG. 9 is a flow chart showing first normal hysteresis peak determination processing.

The first normal hysteresis peak determination processing is specifically described with reference to FIG. 9. The signal processing unit 18 extracts paired data of which a hysteresis flag is set to be ON from all paired data derived in the previous time scanning (step S127). The hysteresis flag is a flag indicating whether or not to execute the pairing processing. In this illustrative embodiment, when the hysteresis flag is ON, the pairing processing is executed. Then, the signal processing unit 18 extracts paired data of which a priority own vehicle lane preceding vehicle status flag is set to be ON from the paired data of which the hysteresis flag is set to be ON (step S128). The priority own vehicle lane preceding vehicle status flag is a flag that is set to be ON for a preceding vehicle, which exists at the closest position to the own vehicle, of preceding vehicles traveling in the same lane as the own vehicle, and is set to be OFF for the other preceding vehicles.

Then, the signal processing unit 18 derives predicted peak signals from the previous time paired data extracted in steps S127 and S128 (step S129). Specifically, the signal processing unit 18 separates the previous paired data into the respective peak signals of the UP and DOWN sections by performing opposite processing to the processing of pairing the respective peak signals of the UP and DOWN sections to thus derive the paired data. Then, the signal processing unit 18 derives a predicted UP peak signal and a predicted DN peak signal by using the frequency and angle information of the respective peak signals.

Then, the signal processing unit 18 extracts hysteresis peak signals corresponding to the predicted peak signals from the hysteresis peak signals within a predetermined frequency range centered on the frequencies of the predicted peak signals in each of the UP and DOWN sections (step S130). Specifically, the signal processing unit 18 first extracts a hysteresis UP peak signal corresponding to the predicted UP peak signal from the hysteresis peak signals existing within a range of 6 BIN (3 BIN at a low frequency side and at a high frequency side, respectively) centered on the frequency of the predicted UP peak signal. Also, the signal processing unit 18 extracts a hysteresis DN peak signal corresponding to the predicted DN peak signal from the hysteresis peak signals existing within a range of 6 BIN centered on the frequency of the predicted DN peak signal. In the meantime, 1 BIN is about 468 Hz.

Then, the signal processing unit 18 extracts hysteresis peak signals of which a difference between an angle derived from the extracted hysteresis peak signal and an angle (predicted angle) derived from the predicted peak signal is 4° or smaller (step S131). Specifically, the signal processing unit 18 derives an angle from the extracted hysteresis UP peak signal by the same processing as the azimuth calculation. Then, the signal processing unit 18 compares the derived angle and the predicted angle derived from the predicted UP peak signal and extracts a hysteresis UP peak signal (hereinafter, referred to as a 'normal hysteresis UP peak signal') of which a difference of the angles is 4° or smaller. Also for the hysteresis DN peak signal, the signal processing unit 18 compares an angle derived from the hysteresis DN peak signal and an angle derived from the predicted DN peak signal and extracts a hysteresis DN peak signal (hereinafter, referred to as a 'normal hysteresis DN peak signal') of which a difference of the angles is 4° or smaller.

Figure 10A:
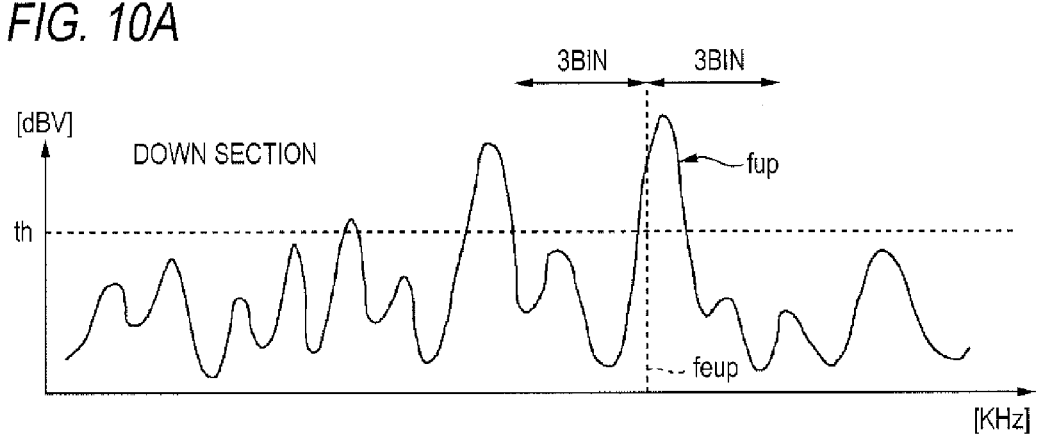
FIGS. 10A and 10B show hysteresis peak signals.
Figure 10B:
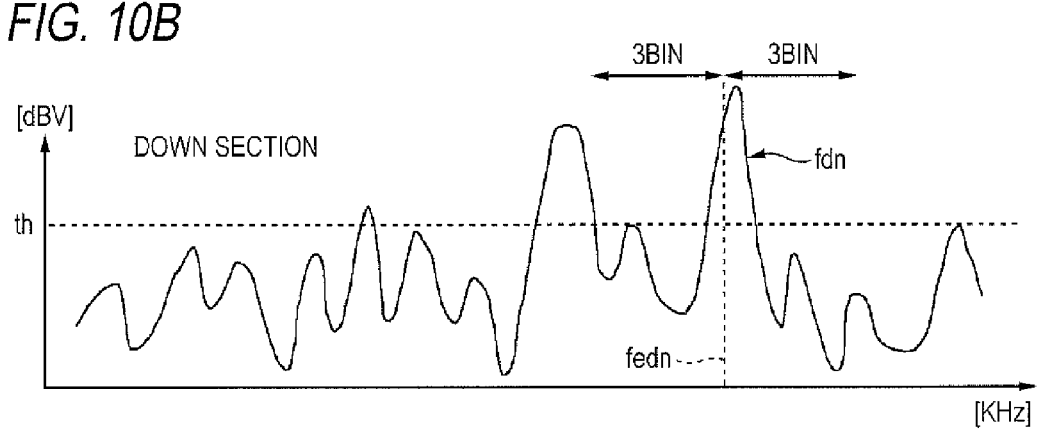

The processing of steps S130 and S131 is described with reference to FIGS. 10A, 10B, 11A and 11B. FIGS. 10A and 10B show the hysteresis peak signal, in which FIG. 10A shows the hysteresis peak signal of the UP section and FIG. 10B shows the hysteresis peak signal of the DOWN section. The signal processing unit 18 searches the hysteresis peak signal corresponding to the predicted UP peak signal within the range of 3 BIN at each of the high frequency-side and the low frequency-side centering around the frequency feup of the predicted UP peak signal. For the case shown in FIG. 10A, there is the corresponding hysteresis peak signal fup and the signal processing unit 18 extracts the hysteresis peak signal as the hysteresis UP peak signal fup. Likewise, the signal processing unit 18 searches the hysteresis peak signal corresponding to the predicted DN peak signal within the range of 3 BIN at each of the high frequency-side and the low frequency-side centering around the frequency fedn of the predicted DN peak signal. For the case shown in FIG. 10B, there is the corresponding hysteresis peak signal fdn and the signal processing unit 18 extracts the hysteresis peak signal as the hysteresis DN peak signal.

Figure 11A:
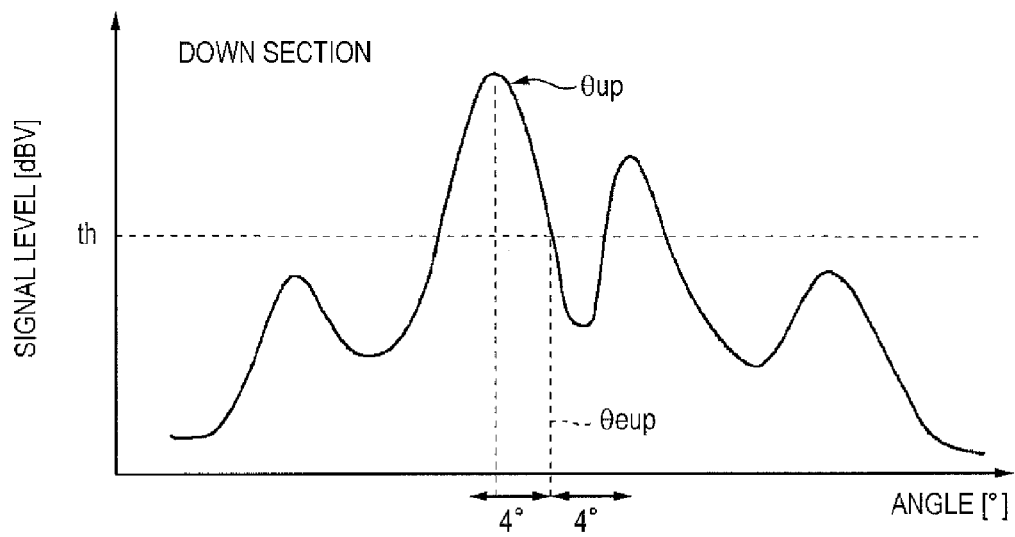
FIGS. 11A and 11B show angle spectra.

Then, the signal processing unit 18 derives an angle θup from the extracted hysteresis UP peak signal fup by the azimuth calculation. FIG. 11A shows an angle spectrum derived from the hysteresis UP peak signal fup. The signal processing unit 18 determines whether the angle θup is within 4° from a predicted angle θeup derived from the predicted UP peak signal. When the angle θup is within 4° from the predicted angle θeup, the hysteresis UP peak signal fup becomes a normal hysteresis UP peak signal.

Figure 11B:
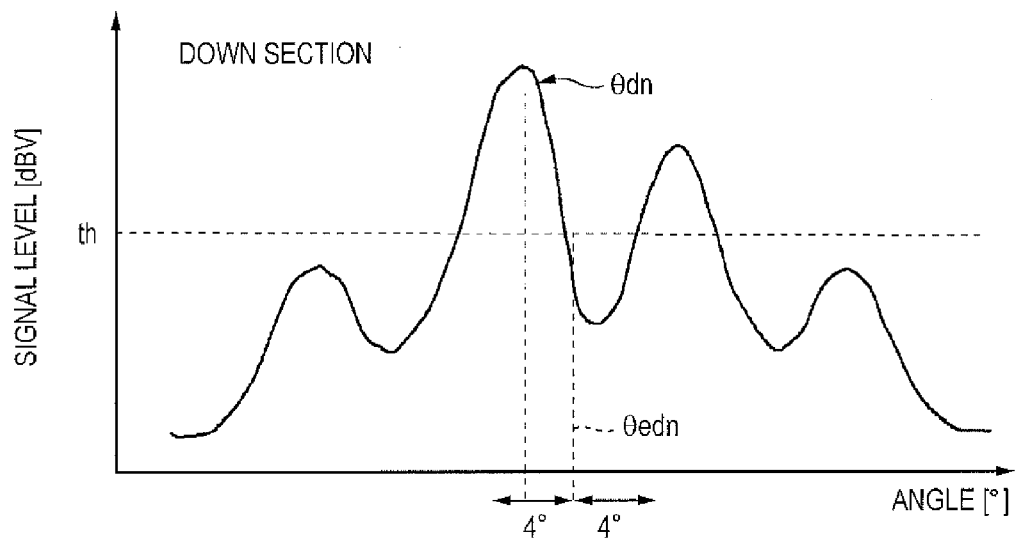

Likewise, the signal processing unit 18 derives an angle θdn from the extracted hysteresis DN peak signal fup by the azimuth calculation. FIG. 11B shows an angle spectrum derived from the hysteresis DN peak signal fdn. The signal processing unit 18 determines whether the angle θdn is within 4° from a predicted angle θedn derived from the predicted DN peak signal. When the angle θdn is within 4° from the predicted angle θedn, the hysteresis DN peak signal fdn becomes a normal hysteresis DN peak signal.

In the meantime, when a plurality of the angles θup derived from the hysteresis UP peak signal fup is within 4°, the angle θup closest to the predicted angle θup is used as the angle of the normal hysteresis UP peak signal. The hysteresis DN peak fdn is also the same.

Returning back to FIG. 9, the signal processing unit 18 performs normal hysteresis peak determination processing (step S132). The normal hysteresis peak determination processing is processing of determining whether both the normal hysteresis UP peak signal and the normal hysteresis DN peak signal exist. Specifically, when there are the normal hysteresis UP peak signal and the normal hysteresis DN peak signal satisfying the conditions of steps S130 and S131, the signal processing unit 18 determines that the normal hysteresis peak signal exists. In the meantime, the normal hysteresis UP peak signal and the normal hysteresis DN peak signal are a combination becoming hysteresis paired data that will be described later. In comparison to this, when any one or both of the normal hysteresis UP peak signal and the normal hysteresis DN peak signal do not exist, the signal processing unit determines that there is no normal hysteresis peak signal.

Figure 12A:
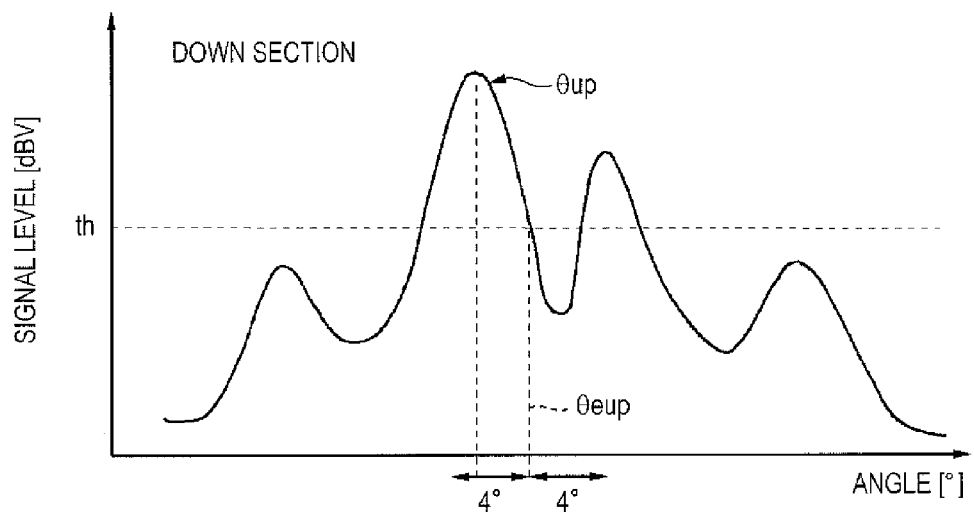
FIGS. 12A and 12B show angle spectra.
Figure 12B:
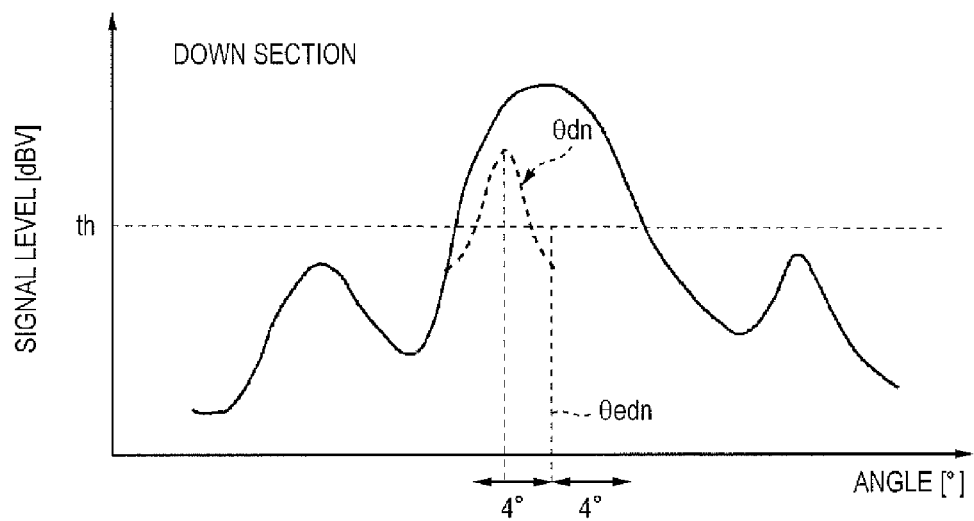

Here, a case where any one of the normal hysteresis UP peak signal and the normal hysteresis DN peak signal does not exist is described with reference to FIGS. 12A and 12B. FIGS. 12A and 12B show angle spectra derived from the normal hysteresis UP peak signal and the normal hysteresis DN peak signal derived in the same manner as FIGS. 11A and 11B. In the example of FIGS. 12A and 12B, the angle θup derived from the hysteresis UP peak signal fup is within 4° of the predicted angle θeup and the extracted hysteresis UP peak signal fup is the normal hysteresis UP peak signal.

In contrast, regarding the angle spectrum derived from the hysteresis DN peak signal, the angle θdn that should originally exist does not appear as a peak signal and cannot be thus detected. Therefore, the hysteresis DN peak signal does not satisfy the condition of step S131. A main cause thereof is as follows, for example: strength of the reflected wave from a road side object and the like existing at the same distance as the preceding vehicle is strong and an angle peak of the preceding vehicle is included in an angle peak of the road side object and the like, so that it does not appear as a peak. In this case, the signal processing unit 18 determines that the hysteresis DN peak signal is not a normal hysteresis DN peak signal and the normal hysteresis peak signal does not exist.

Returning back to FIG. 8, when it is determined as a result of the first normal hysteresis peak determination that the normal hysteresis peak signal exists (Yes in step S122), the signal processing unit 18 performs hysteresis paired data deriving processing (step S126). In this case, the signal processing unit derives the hysteresis paired data by pairing the extracted normal hysteresis UP peak signal and normal hysteresis DN peak signal. On the other hand, when it is determined that the normal hysteresis peak signal does not exist (No in step S122), the signal processing unit 18 performs second normal hysteresis peak determination processing (step S123).

The second normal hysteresis peak determination processing is processing of extracting hysteresis peak signals corresponding to the predicted UP peak signal and predicted DN peak signal from the hysteresis peak signals included in a frequency range different from the first normal hysteresis peak determination processing. As described above, even when a peak does not appear at an angle at which it should originally exist, an angle peak to be targeted may appear in the hysteresis peak signal of another frequency. Therefore, in this illustrative embodiment, the same processing as the first normal hysteresis peak determination processing is performed with the frequency range to be searched being extended.

The second normal hysteresis peak determination processing is specifically described with reference to FIG. 13. The signal processing unit 18 extracts paired data of which the hysteresis flag is set to be ON from all the paired data derived in the previous time scanning (step S133). Then, the signal processing unit 18 extracts paired data of which the priority own vehicle lane preceding vehicle status flag is set to be ON from the paired data of which the hysteresis flag is set to be ON (step S134). The steps S133 and S134 are the same as the steps S127 and S128.

Then, the signal processing unit 18 derives a distance to the own vehicle on the basis of the extracted previous time paired data and determines whether the distance satisfies one of a condition (1) that the distance is 50 m or shorter, a condition (2) that the distance is longer than 50 m and 80 m or shorter and a condition (3) that the distance is longer than 80 m and 100 m or shorter (step S135). Then, the signal processing unit 18 performs the extraction processing of the hysteresis peak signal in accordance with the distance in the frequency range wider than that of the first normal hysteresis peak determination processing.

In the meantime, the second normal hysteresis peak determination processing is performed in a section in which the normal hysteresis UP peak signal and the normal hysteresis DN peak signal could not be extracted in the first normal hysteresis peak determination processing. In the below, a case where the normal hysteresis UP peak signal could be extracted in the UP section but the normal hysteresis DN peak signal could not be extracted in the DOWN section is exemplified. However, the invention is not limited thereto and the second normal hysteresis peak determination processing may be performed in both the UP section and the DOWN section.

Specifically, when the distance is 50 m or shorter (the condition (1)), the signal processing unit 18 extracts a hysteresis peak signal (a hysteresis DN peak signal) corresponding to the predicted DN peak signal from the hysteresis peak signals existing within a range of 10 BIN (5 BIN at the low frequency-side and at the high frequency-side, respectively) centered on the frequency of the predicted DN peak signal derived by the above method (step S136).

Then, the signal processing unit 18 extracts a hysteresis DN peak signal (a normal hysteresis DN peak signal) of which a difference to the expected angle is 1.5° or smaller or a difference to the expected relative transverse distance is 0.9 m or shorter (step S137). Specifically, the signal processing unit 18 extracts the angle and relative transverse distance from the hysteresis DN peak signal derived in step S136. Then, the signal processing unit 18 compares the derived angle and the expected angle derived from the predicted DN peak signal and extracts a hysteresis DN peak signal of which a difference of the angles is 1.5° or smaller. Also, even when this condition is not satisfied, the signal processing unit 18 compares the relative transverse distance derived from the hysteresis DN peak signal and the relative transverse distance (predicted relative transverse distance) derived from the predicted DN peak signal and extracts a hysteresis DN peak signal of which a difference of the distances is 0.9 m or shorter. That is, the signal processing unit 18 extracts the hysteresis DN peak signal satisfying any one of the conditions.

Figures 14A, 14B:
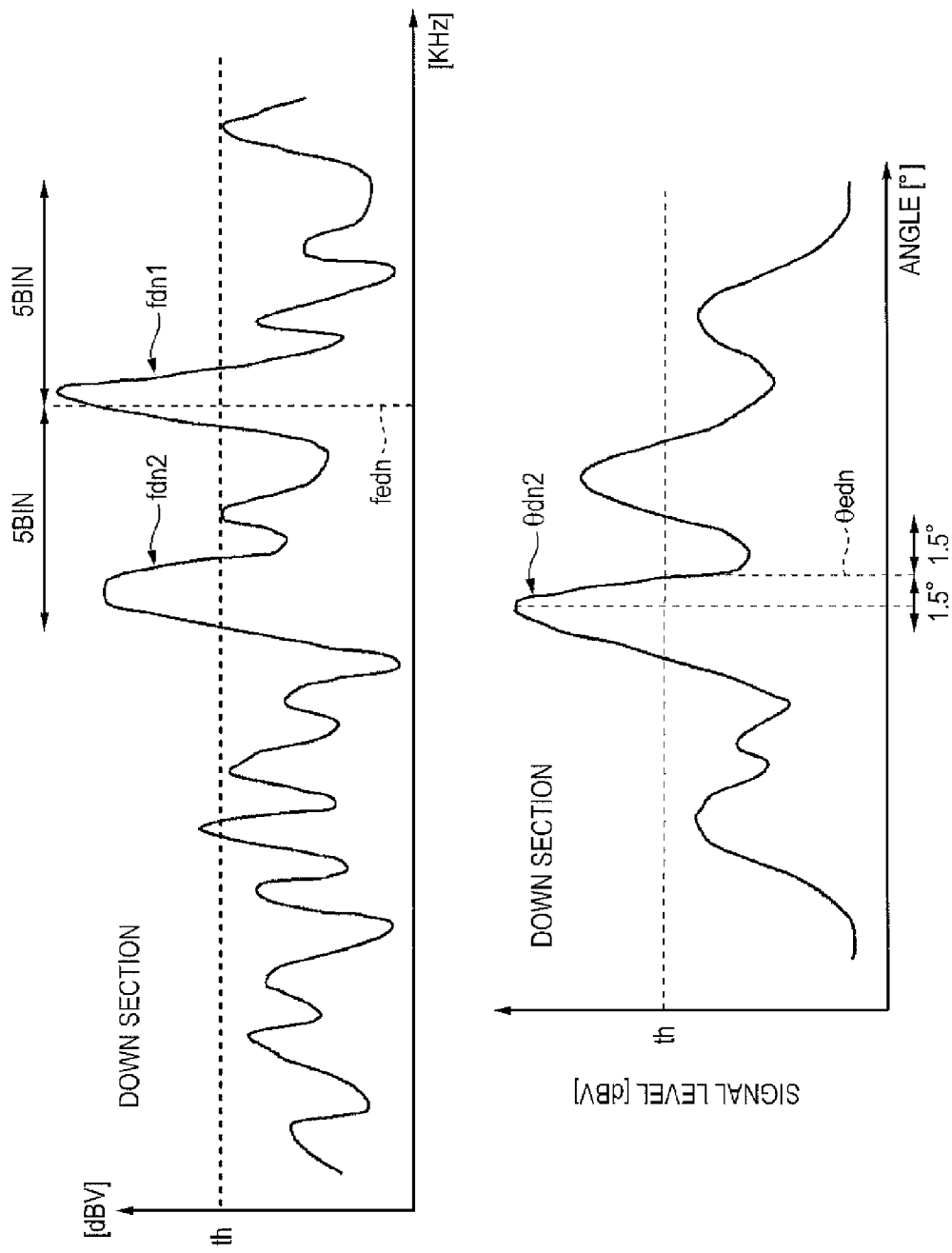
FIG. 14A shows a hysteresis peak signal and FIG. 14B shows an angle spectrum.

The processing of steps S136 and S137 is described with reference to FIGS. 14A and 14B. FIG. 14A shows a hysteresis DN peak signal and FIG. 14B shows an angle spectrum. As shown in FIG. 14A, the signal processing unit 18 searches the hysteresis peak signal corresponding to the predicted DN peak signal within the range of 5 BIN at each of the high frequency-side and the low frequency-side centering around the frequency fedn of the predicted DN peak signal. For the case shown in FIG. 14A, it is assumed that there is the corresponding hysteresis peak signal fdn but the hysteresis peak signal fdn1 does not have an angle peak and is not a normal hysteresis DN peak signal. Also in this case, in FIG. 14A, the hysteresis peak signal fdn2 corresponding to the predicted DN peak signal exists within the range of 5 BIN. Therefore, the signal processing unit 18 extracts the hysteresis peak signal as the hysteresis DN peak signal.

Then, the signal processing unit 18 derives an angle θdn2 from the extracted hysteresis DN peak signal fdn2. FIG. 14B shows an angle spectrum derived from the hysteresis DN peak signal fdn2. The signal processing unit 18 determines whether a difference between the predicted angel θedn derived from the predicted DN peak signal and the angle θdn2 is 1.5° or smaller. When the difference between the angle θdn2 and the predicted angle θedn is 1.5° or smaller, the hysteresis DN peak signal fdn2 becomes a normal hysteresis DN peak signal.

Also, even when the difference between the angle θdn2 and the predicted angle θedn is not 1.5° or smaller, if the relative transverse distance derived from the hysteresis DN peak signal fdn2 and the predicted relative transverse distance derived from the hysteresis DN peak signal is 0.9 m or shorter, the hysteresis DN peak signal fdn2 becomes a normal hysteresis DN peak signal.

Returning back to FIG. 13, when the distance is longer than 50 m and 80 m or shorter (the condition (2)), the signal processing unit 18 extracts a hysteresis DN peak signal corresponding to the predicted DN peak signal from the hysteresis peak signals existing within the range of 10 BIN centered on the frequency of the predicted DN peak signal (step S138). Then, the signal processing unit 18 determines whether a difference between the angle derived from the extracted hysteresis DN peak signal and the angle derived from the predicted DN peak signal is 1.0° or smaller (step S139). When the difference of the angles is smaller than 1.0°, the extracted hysteresis DN peak signal becomes a normal hysteresis DN peak signal. The respective processing is the same as the processing that is performed when the distance is 50 m or shorter (the condition (1)).

Also, when the distance is longer than 80 m and 100 m or shorter (the condition (3)), the signal processing unit 18 extracts a hysteresis DN peak signal corresponding to the predicted DN peak signal from the hysteresis peak signals existing within the range of 10 BIN centered on the frequency of the predicted DN peak signal (step S140). Then, the signal processing unit 18 determines whether a difference between the angle derived from the extracted hysteresis DN peak signal and the angle derived from the predicted DN peak signal is 0.5° or smaller (step S141). When the difference of the angles is smaller than 0.5°, the extracted hysteresis DN peak signal becomes a normal hysteresis DN peak signal. The respective processing is also the same as the processing that is performed when the distance is 50 m or shorter (the condition (1)).

In each of the conditions (1) to (3), when a plurality of the normal hysteresis DN peak signals corresponding to the predicted DN peak signal is extracted within the range of 10 BIN, the normal hysteresis DN peak signal of the frequency BIN closest to the own vehicle is used. Also, when a plurality of normal hysteresis DN peak signals having the same frequency BIN is extracted, the normal hysteresis DN peak signal of which the difference between the relative transverse distance and the predicted relative transverse distance is smallest is used. This is also the same for a case where the processing of extracting the normal hysteresis UP peak signal or processing of extracting both peak signals is performed in the second normal hysteresis peak determination processing.

Then, the signal processing unit 18 executes the normal hysteresis peak determination processing (step S142). In the first normal hysteresis peak determination processing, when it is determined that the normal hysteresis UP peak signal exists but the normal hysteresis DN peak signal does not exist, the signal processing unit 18 determines whether there is the normal hysteresis DN peak signal satisfying any one of the conditions (1) to (3). If yes, the signal processing unit 18 determines that the normal hysteresis peak signal exists. In this case, the normal hysteresis UP peak signal acquired in the first normal hysteresis peak determination processing and the normal hysteresis DN peak signal acquired in the second normal hysteresis peak determination processing is a combination becoming the hysteresis paired data that will be described later. In comparison to this, when it is also determined in the second normal hysteresis peak determination processing that the normal hysteresis DN peak signal does not exist, the signal processing unit 18 determines that there is no normal hysteresis peak signal.

Also, when it is determined in the first normal hysteresis peak determination processing that any of the normal hysteresis UP peak signal and the normal hysteresis DN peak signal does not exist, the signal processing unit 18 determines whether both the normal hysteresis UP peak signal and the normal hysteresis DN peak signal satisfying any one of the conditions (1) to (3) exist. If yes, the signal processing unit 18 determines that the normal hysteresis peak signal exists. In this case, the normal hysteresis UP peak signal and the normal hysteresis DN peak signal acquired in the second normal hysteresis peak determination processing is a combination becoming the hysteresis paired data that will be described later. In comparison to this, when it is determined in the second normal hysteresis peak determination processing that any one or both the normal hysteresis UP peak signal and the normal hysteresis DN peak signal do not exist, the signal processing unit 18 determines that there is no normal hysteresis peak signal.

Returning back to FIG. 8, when it is determined as a result of the second normal hysteresis peak determination processing that the normal hysteresis peak signal exists (Yes in step S124), the signal processing unit 18 performs hysteresis paired data deriving processing (step S126). In this case, the hysteresis paired data is derived by pairing the extracted normal hysteresis UP peak signal and normal hysteresis DN peak signal. On the other hand, when it is determined that the normal hysteresis peak signal does not exist (No in step S124), the signal processing unit 18 performs one side hysteresis peak determination processing (step S125).

The one side hysteresis peak determination processing is processing of searching the other hysteresis peak signal that could not be extracted in the first normal hysteresis peak determination processing although any one of the normal hysteresis UP peak signal and the normal hysteresis DN peak signal could be extracted.

In the first normal hysteresis peak determination processing, the signal processing unit 18 determines whether both the normal hysteresis UP peak signal and the normal hysteresis DN peak signal exist. Therefore, when any one does not exist, the signal processing unit does not determine the normal hysteresis peak signal but holds a result of the determination indicating that only one peak signal exists. For this reason, in the one side hysteresis peak determination processing, the signal processing unit 18 extracts a hysteresis peak signal in which only one of the normal hysteresis UP peak signal and the normal hysteresis DN peak signal exists from the result of the first normal hysteresis peak determination processing. Then, when the hysteresis peak signal exists, the signal processing unit 18 determines that one side hysteresis peak signal exists, and when the hysteresis peak signal does not exist, the signal processing unit determines that one side hysteresis peak signal does not exist.

Then, the signal processing unit derives the hysteresis paired data, based on the results of the respective determination processing (step S126). In the first normal hysteresis peak determination processing and second normal hysteresis peak determination processing, when it is determined that the normal hysteresis peak signal exists, it indicates that both the normal hysteresis UP peak signal and the normal hysteresis DN peak signal exist. Therefore, the signal processing unit 18 derives the hysteresis paired data by pairing both the signals.

Meanwhile, when it is determined in the one side hysteresis peak determination processing that one side hysteresis peak signal exists, only one of the normal hysteresis UP peak signal and the normal hysteresis DN peak signal exists. Therefore, the signal processing unit 18 derives the hysteresis paired data by pairing the hysteresis peak signal of which the angle information has been acquired and the hysteresis peak signal of which the angle information could not be acquired. For example, in the above example, the signal processing unit 18 derives the hysteresis paired data by pairing the normal hysteresis UP peak signal of which the peak signal after the FFT processing exists and the angle information has been derived and the hysteresis DN peak signal of which the peak signal after the FFT processing exists but the angle information could not be derived.

In the meantime, when one of the normal hysteresis UP peak signal and the normal hysteresis DN peak signal exists but the other cannot extract the hysteresis peak signal corresponding to the predicted peak signal (i.e., when the peak signal after the FFT processing does not exist and the angle information could not be derived), the signal processing unit 18 derives the hysteresis paired data by pairing the existing normal hysteresis UP peak signal or normal hysteresis DN peak signal and the predicted DN peak signal or predicted UP peak signal of the other peak signal.

As described above, in this illustrative embodiment, when it is not possible to extract the corresponding hysteresis peak signal within the predetermined frequency range on the basis of the frequency of the predicted peak signal, the processing is again performed with the frequency range to be searched being extended. Therefore, for example, even when the angle peak does not appear due to the influence of the peak signal of the road side object and the like, it is possible to derive the paired data by using the hysteresis peak signal existing at the frequency in the extended range. In the meantime, when the frequency range to be searched is extended, a possibility that a peak signal becoming a noise will be detected is also increased. For this reason, when the frequency range to be searched is extended, the angle range to be searched is narrowed. Thereby, it is possible to detect a target that cannot be detected in the conventional frequency range, so that it is possible to prevent a false target from being detected or a target, which should originally exist, from not being detected. Therefore, it is possible to avoid performing the false vehicle control.

In the above, the hysteresis pairing processing (step S117) is performed for the paired data of which the priority own vehicle lane preceding vehicle status flag is set to be ON. However, in addition to this, the hysteresis pairing processing may be performed for the paired data of which the priority own vehicle lane preceding vehicle status flag is set to be OFF, after executing the processing of steps S121 to S126. The hysteresis pairing processing that is performed for the paired data of which the priority own vehicle lane preceding vehicle status flag is set to be OFF is the processing of steps S121, S122, S125 and S126.

Returning back to FIG. 7, after executing the hysteresis pairing processing, the signal processing unit performs stationary object pairing processing (step S118). This is pairing processing that is performed for the stationary object peak extracted in the stationary object peak extraction processing. This processing can be performed by the same method as the pairing processing of step S107.

Also, after executing the stationary object pairing processing, the signal processing unit performs new pairing processing (step S119). This is pairing processing that is performed for the peak signal except for the hysteresis peak signal and the stationary object peak signal of the peak signals extracted in the peak extraction processing. This processing can be also performed by the same method as the pairing processing of step S107.

Then, the signal processing unit 18 derives the distance, the relative speed and the like (step S120). That is, the signal processing unit 18 derives the longitudinal distance, the relative speed, the angle, the transverse distance and the like, based on the paired data derived in the respective pairing processing. When performing the derivation on the basis of the stationary object paired data derived in the stationary object pairing processing and the new paired data derived in the new pairing processing, the derivation processing can be performed by the same method using the equations (1) to (3). In the below, the derivation processing that is performed on the basis of the hysteresis paired data derived in the hysteresis pairing processing is described with reference to FIG. 15.

Figure 15:
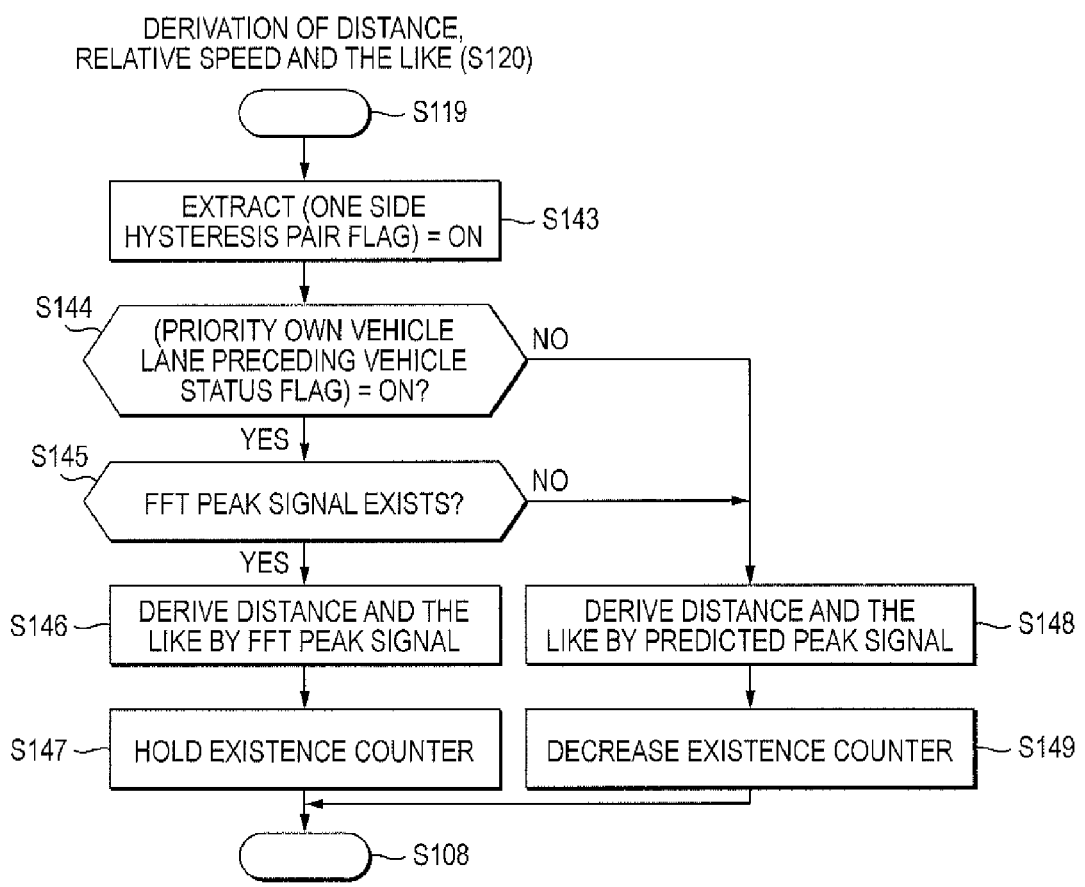

FIG. 15 is a flow chart showing processing of deriving the distance, the relative speed and the like. The signal processing unit 18 extracts hysteresis paired data of which a one side hysteresis pair flag is set to be ON (step S143). The one side hysteresis pair flag is a flag that is set to be ON when it is determined in the one side hysteresis peak determination processing that one side hysteresis peak signal exists. Therefore, when one side hysteresis pair flag is ON, the hysteresis peak data has only one of the normal hysteresis UP peak signal and the normal hysteresis DN peak signal and the other is the hysteresis DN peak signal or hysteresis UP peak signal or the predicted DN peak signal or predicted UP peak signal.

Then, the signal processing unit 18 extracts hysteresis paired data of which the priority own vehicle lane preceding vehicle status flag is set to be ON (step S144). This is to extract the hysteresis paired data for which the hysteresis pairing processing (step S117) has been executed. Since the one side hysteresis peak determination processing is processing that is executed when the priority own vehicle lane preceding vehicle status flag is set to be ON, the flag is usually ON. Then, the signal processing unit 18 determines whether the FFT peak signal (the peak signal after the FFT processing) exists in the peak signal of the extracted hysteresis paired data (step S145).

When the FFT peak signal exists, the signal processing unit derives the distance and the like by using the FFT peak signal (step S146). For example, as described above, for the hysteresis paired data consisting of the normal hysteresis UP peak signal and the hysteresis DN peak signal, the signal processing unit 18 derives the distance, the relative speed and the like by using the FFT peak signal of the normal hysteresis UP peak signal and the FFT peak signal of the hysteresis DN peak signal. Also, since the hysteresis DN peak signal does not have the angle information, the signal processing unit 18 derives the angle information of the normal hysteresis UP peak signal, as an angle of the hysteresis paired data.

The distance and the like can be derived using the equations (1) to (3). That is, in the equations (1) and (2), a frequency of the FFT peak signal of the normal hysteresis UP peak signal is used as fup and a frequency of the FFT peak signal of the hysteresis DN peak signal is used as fdn. Also, in the equation (3), an angle derived from the normal hysteresis UP peak signal is used as θup and θdn is not used because it has not been derived. Therefore, the angle of the hysteresis paired data θm=θup.

On the other hand, when the priority own vehicle lane preceding vehicle status flag is not ON or the FFT peak signal does not exist in the peak signal of the hysteresis paired data, the distance and the like are derived using the predicted peak signal (step S148). In this case, since one side of the hysteresis paired data is the predicted peak signal, the predicted peak signal is used. For example, for the hysteresis paired data consisting of the normal hysteresis UP peak signal and the predicted DN peak signal, the signal processing unit 18 derives the distance and the relative speed by using the FFT peak signal of the normal hysteresis UP peak signal and the predicted DN peak signal. Also, although it is possible to derive the predicted angle information from the predicted DN peak signal, the signal processing unit 18 derives the angle information of the normal hysteresis UP peak signal, as an angle of the hysteresis paired data.

The distance and the like can be derived using the equations (1) to (3). That is, in the equations (1) and (2), a frequency of the FFT peak signal of the normal hysteresis UP peak signal is used as fup and a frequency of the FFT peak signal of the predicted DN peak signal is used as fdn. Also, in the equation (3), an angle derived from the normal hysteresis UP peak signal is used as θup and θdn is not used. Therefore, the angle of the hysteresis paired data θm=θup.

Then, when the distance and the like are derived using the FFT peak signals of the respective peak signals of the hysteresis paired data, the signal processing unit 18 keeps an existence counter (step S147). When the distance and the like are derived using the FFT peak signals of the predicted peak signals, the signal processing unit decreases the existence counter (step S149). The existence counter is a counter that increases or decreases depending on the reliability of the paired data detected in the scanning after the detected paired data is decided as a target. That is, the existence counter increases when the reliability of the same target is high and decreases when the reliability is low. The existence counter is used to lose a target when a low state of the reliability thereof continues.

For example, in this illustrative embodiment, when the normal hysteresis peak signal exists, the signal processing unit 18 increases the existence counter by two (2), and when neither the normal hysteresis peak signal nor the one side hysteresis peak signal exists, the signal processing unit decreases the existence counter by one (1). In comparison to this, when the one side hysteresis peak signal exists, the signal processing unit 18 changes the existence counter depending on whether the hysteresis peak signal is extracted or not.

Specifically, when the hysteresis peak signal corresponding to the predicted peak signal is extracted in each of the UP and DOWN sections (when the FFT peak signal exists), the signal processing unit 18 holds the existence counter (step S147). That is, when the distance and the like are derived using the FFT peak signals of the hysteresis peak signals in the UP and DOWN sections, the signal processing unit 18 holds the existence counter. In contrast, when the hysteresis peak signal corresponding to the predicted peak signal is not extracted in any one section (when the FFT peak signal does not exist), the signal processing unit 18 decreases the existence counter by one (1) (Step S149). That is, when the distance and the like are derived using the predicted peak signal in any one of the UP and DOWN sections, the signal processing unit 18 decreases the existence counter by one (1).

When the FFT peak signal does not exist, the predicted peak signal is used. Thus, the reliability is thought to be low, so that the signal processing unit 18 operates the counter with an intention of losing the target (decreases the counter). However, when the FFT peak signal exists, even though the angle information cannot be derived, there is a possibility that a peak signal of a target, which actually exists, cannot be detected due to the influence of the road side object and the like. For this reason, if the counter is decreased, the target may be lost when the same status continues. Therefore, when there is a possibility that a target exists, the signal processing unit operates the counter with an intention of not losing the target (holds the counter).

In the above, the case where the one side hysteresis peak signal exists in the derivation processing based on the hysteresis paired data derived in the hysteresis pairing processing has been described. In the below, another case is described. When the normal hysteresis peak signal exists, the signal processing unit may derive the distance and the relative speed by using the FFT peak signals of the hysteresis peak signals in the respective sections and derive the angle of the paired data by using the angle information derived from the FFT peak signals of the hysteresis peak signals in the respective sections. Also, when neither the normal hysteresis peak signal nor the one side hysteresis peak signal exists, the signal processing unit may derive the distance, the relative speed and the angle by using the predicted peak signals in both the UP and DOWN sections.

Like this, in this illustrative embodiment, even though the angle information cannot be detected from the one side peak signal, when the FFT peak signals are extracted, the paired data is derived and the information of the distance and the like is derived by using the actually extracted FFT peak signals, not the FFT peak signals of the predicted peak signals. By using the actually extracted FFT peak signals, it is possible to derive the information of the distance and the like having the higher reliability than the case where the predicted peak signals are used.

Although the illustrative embodiments of the invention have been described, the invention is not limited to the above illustrative embodiments. Also, the respective illustrative embodiments can be appropriately combined.

Also, in the respective illustrative embodiments, the various functions are software-implemented by the calculation processing of the CPU in response to the programs. However, some of the functions may be implemented by an electrical hardware circuit. Also, to the contrary, some of functions that are implemented by the hardware circuit may be software-implemented.

What is claimed is:

1. A radar apparatus configured to extract peak signals which are obtained from a difference frequency between a transmission signal of which a frequency changes with a predetermined cycle and a reception signal obtained by receiving a reflected wave coming from a target at which a transmission wave corresponding to the transmission signal is reflected, in a first period in which the frequency of the transmission signal ascends and in a second period in which the frequency descends, and to derive information of the target on the basis of the extracted peak signals, the radar apparatus comprising:
   a prediction unit configured to predict this time peak signal based on a peak signal obtained in previous time; and
   an extraction unit configured to perform an extraction process extracting this time peak signal corresponding to the predicted peak signal from peak signals existing within a predetermined frequency range,
   wherein the extraction unit, when this time peak signal corresponding to the predicted peak signal does not exist within the predetermined frequency range, further performs the extraction process of extracting this time peak signal within another frequency range wider than the predetermined frequency range.

2. The radar apparatus according to claim 1, further comprising a derivation unit configured to derive an angle with respect to the target on the basis of the peak signals,
   wherein the extraction unit, when there is no peak signal having an angle corresponding to an angle derived from the predicted peak signal, further performs the extracting process within said another frequency range wider than the predetermined frequency range.

3. The radar apparatus according to claim 2, wherein the extraction unit, when there is no peak signal having an angle of which a difference to an angle derived from the predicted peak signal is a predetermined value or smaller, further performs the extraction process within said another frequency range wider than the predetermined frequency range.

4. The radar apparatus according to claim 3, wherein when the extraction unit further performs the extraction process within said another frequency wider than the predetermined frequency range, the extraction unit decreases the predetermined value.

5. The radar apparatus according to claim 2,
   wherein the prediction unit predicts this time peak signal for the respective peak signals of the first and second periods, and
   wherein when there is no peak signal having an angle of which a difference to an angle derived from the predicted peak signal for at least one of the respective peak signals of the first and second periods is a predetermined value or smaller, the extraction unit further performs the extraction process within said another frequency range wider than the predetermined frequency range.

6. The radar apparatus according to claim 1, wherein the predetermined frequency range is a range in which a frequency of the predicted peak signal is a center thereof.

7. The radar apparatus according to claim 1, further comprising a derivation unit configured to derive the information of the target on the basis of the extracted peak signals, wherein when only an angle derived from the peak signal extracted in one of the first and second periods is an angle corresponding to an angle derived from the predicted peak signal, the derivation unit derives the information of the target on the basis of frequencies of the respective peak signals extracted in the first and second periods and the corresponding angle.

8. The radar apparatus according to claim 1, wherein the predetermined frequency range is a predetermined limited range.

9. A signal processing method of extracting peak signals which are obtained from a difference frequency between a transmission signal of which a frequency changes with a predetermined cycle and a reception signal obtained by receiving a reflected wave coming from a target at which a transmission wave corresponding to the transmission signal is reflected, in a first period in which the frequency of the transmission signal ascends and in a second period in which the frequency descends, and deriving information of the target on the basis of the extracted peak signals, the signal processing method comprising:

(a) predicting this time peak signal based on a peak signal obtained in previous time; and (b) perform an extraction process of extracting this time peak signal corresponding to the predicted peak signal from peak signals existing within a predetermined frequency range, wherein the step (b), the extraction process is performed with another frequency range wider than the predetermined frequency range when this time peak signal corresponding to the predicted peak signal does not exist within the predetermined frequency range.

* * * * *